United States Patent
Kim et al.

(10) Patent No.: US 11,510,142 B2
(45) Date of Patent: *Nov. 22, 2022

(54) METHOD AND APPARATUS FOR OPERATING PROTOCOL LAYER OF TERMINAL IN INACTIVE MODE IN NEXT-GENERATION MOBILE COMMUNICATION SYSTEM

(71) Applicant: Samsung Electronics Co., Ltd., Suwon-si (KR)

(72) Inventors: Donggun Kim, Suwon-si (KR); Soenghun Kim, Suwon-si (KR); Sangyeob Jung, Suwon-si (KR); Alexander Sayenko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 3 days.

This patent is subject to a terminal disclaimer.

(21) Appl. No.: 17/164,007

(22) Filed: Feb. 1, 2021

(65) Prior Publication Data
US 2021/0185610 A1 Jun. 17, 2021

Related U.S. Application Data

(63) Continuation of application No. 16/376,334, filed on Apr. 5, 2019, now Pat. No. 10,912,031.

(30) Foreign Application Priority Data

Apr. 5, 2018 (KR) .......... 10-2018-0039846
May 18, 2018 (KR) .......... 10-2018-0057345

(51) Int. Cl.
*H04W 52/02* (2009.01)
*H04W 76/27* (2018.01)

(52) U.S. Cl.
CPC ....... *H04W 52/0225* (2013.01); *H04W 76/27* (2018.02)

(58) Field of Classification Search
CPC . H04L 41/0896; H04L 5/0078; H04L 5/0098; H04L 1/0061; H04L 43/0847;
(Continued)

(56) References Cited

U.S. PATENT DOCUMENTS

2017/0325282 A1 11/2017 Hong et al.
2017/0332419 A1 11/2017 Kim et al.
(Continued)

FOREIGN PATENT DOCUMENTS

EP 2 139 292 A2 12/2009
WO 2015020507 A1 2/2015
(Continued)

OTHER PUBLICATIONS

"CR on Connection Control ([101 #37][NR] RRC procedures/messages)", 3GPP Draft; CR on NR Connection Control Based on Draft TS38331 V15.1.0_V3, 3rd Generation Partnership Project (3GPP), Mobile Competence Centre; 650, Route Des Lucioles; F-06921 Sophia-Antipolis Cedex, France; RAN WG2, Sanya, P.R. of China; Apr. 16, 2018-Apr. 20, 2018 Apr. 4, 2018 (Apr. 4, 2018), XP051566114.
(Continued)

*Primary Examiner* — Jung Liu
(74) *Attorney, Agent, or Firm* — Jefferson IP Law, LLP

(57) ABSTRACT

A communication method and a system for converging a 5th-Generation (5G) communication system for supporting higher data rates beyond a 4th-Generation (4G) system with a technology for Internet of things (IoT) are provided. The disclosure may be applied to intelligent services based on the 5G communication technology and the IoT-related technology, such as smart home, smart building, smart city,
(Continued)

smart car, connected car, health care, digital education, smart retail, security and safety services. The disclosure relates to schemes for improving an operation of a terminal in an RRC inactive mode.

20 Claims, 12 Drawing Sheets

(58) Field of Classification Search
CPC ..... H04L 5/0053; H04L 5/001; H04L 69/326; H04L 69/324; H04W 76/27; H04W 36/0055; H04W 36/04; H04W 72/042; H04W 74/0833; H04W 36/0022; H04W 36/0027; H04W 36/0077; H04W 8/04; H04W 56/002; H04W 48/20; H04W 36/305; H04W 36/0079; H04W 36/125; H04W 36/14; H04W 48/18; H04W 92/02
See application file for complete search history.

(56) References Cited

U.S. PATENT DOCUMENTS

| | | | | |
|---|---|---|---|---|
| 2018/0049244 | A1* | 2/2018 | Lee | H04W 76/27 |
| 2018/0220369 | A1* | 8/2018 | Wu | H04W 76/19 |
| 2019/0149421 | A1* | 5/2019 | Jin | H04L 5/0053 |
| | | | | 370/331 |
| 2019/0306842 | A1* | 10/2019 | Cirik | H04B 7/0617 |
| 2019/0306867 | A1* | 10/2019 | Cirik | H04W 74/0833 |

FOREIGN PATENT DOCUMENTS

| | | |
|---|---|---|
| WO | 2018/029578 A1 | 2/2018 |
| WO | 2018/056718 A1 | 3/2018 |

OTHER PUBLICATIONS

"3rd Generation Partnership Project; Technical Specification Group Radio Access Network; NR; Packet Data Convergence Protocol (PDCP) specification (Release 15)", 3GPP Draft; R2-1713660 Draft 38323-101_V4_RM, 3rd Generation Partnership Project (3GPP), Mobile Competence Centre; 650, Route Des Lucioles; F-06921 Sophia-Antipolis Cedex, France; Nov. 17, 2017 (Nov. 17, 2017), XP051372327.

"3rd Generation Partnership Project; Technical Specification Group Radio Access Network; NR; User Equipment (UE) procedures in Idle mode and RRC Inactive state (Release 15)", 3GPP Standard; Technical Specification; 3GPP TS 38.304, 3rd Generation Partnership Project (3GPP), Mobile Competence Centre; 650, Route Des Lucioles ; F-06921 Sophia-Antipolis Cedex ; France, No. v1.0.0, Mar. 12, 2018 (Mar. 12, 2018), pp. 1-21, XP051450410.

Samsung: "PDCP reset upon the reception of RRCRelease with suspend-config", 3GPP Draft; 38331 CR0310 (REL-15) R2-1814315 PDCP Reset Upon The Reception of RRCrelease With Suspend-Config, 3rd Generation Partnership Project (3GPP), Mobile Competence Centre ; 650, Route Des Lucio, vol. RAN WG2, No. Chengdu, China; Oct. 8, 2018-Oct. 12, 2018 Sep. 28, 2018 (Sep. 28, 2018), XP051504328.

Extended European Search Report dated Mar. 4, 2021, issued in European Application No. 19782014.5.

International Search Report dated Jul. 16, 2019, issued in International Patent Application No. PCT/KR2019/004074.

Indian Office Action dated Nov. 23, 2021, issued in Indian Application No. 202037036497.

* cited by examiner

METHOD AND APPARATUS FOR OPERATING PROTOCOL LAYER OF TERMINAL IN INACTIVE MODE IN NEXT-GENERATION MOBILE COMMUNICATION SYSTEM

CROSS-REFERENCE TO RELATED APPLICATION(S)

This application is a continuation application of prior application Ser. No. 16/376,334, filed on Apr. 5, 2019, which has issued as U.S. Pat. No. 10,912,031 on Feb. 2, 2021 and is based on and claims priority under 35 U.S.C. § 119(a) of a Korean patent application number 10-2018-0039846, filed on Apr. 5, 2018, and of a Korean patent application number 10-2018-0057345 filed on May 18, 2018, in the Korean Intellectual Property Office, the disclosure of which is incorporated by reference herein in its entirety.

BACKGROUND

1. Field

The disclosure relates to a method and an apparatus for strengthening an efficient operation of a protocol layer device and security when a terminal performs state transition from a radio resource control (RRC) connected mode to an RRC inactive mode or from the RRC inactive mode to the RRC connected mode in a next-generation mobile communication system.

2. Description of the Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System.' The 5G communication system is considered to be implemented in higher frequency (mm Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the Big Data processing technology through connection with a cloud server, has emerged. As technology elements, such as "sensing technology," "wired/wireless communication and network infrastructure," "service interface technology," and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be as an example of convergence between the 5G technology and the IoT technology.

Recently, with the growth of a communication system, various researches for a terminal operating in an RRC inactive mode have been made. Accordingly, there is a need for improvement of a cell selection and reselection method of a terminal operating in an RRC idle mode and a terminal operating in an RRC inactive mode.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below.

A mobile communication system has been developed for the purpose of providing communications while securing user's mobility. With the rapid progress of technology, such a mobile communication system can now provide not only voice communication but also high-speed data communication services. In such a wireless mobile communication system, a terminal may intermittently receive services rather than continuously receive services for a long time. Accordingly, if the terminal continuously receives and identifies a signal of a base station, terminal power will be quickly consumed. Accordingly, it is very important to reduce such power consumption. For this, the terminal may be in a standby mode through switchover from a radio resource control (RRC) connected mode to an RRC idle mode. However, many signaling procedures are necessary for the switchover of the terminal from the standby mode again to the RRC connected mode. Accordingly, in the next-generation mobile communication system, an RRC inactive mode or a lightly-connected mode can be introduced to reduce such signaling procedures, to achieve fast connection, and to save the terminal power as in the standby mode. However, there is a need for an efficient method for switchover from the RRC connected mode to the RRC inactive mode (or lightly-connected mode), or switchover from the RRC inactive mode (or lightly-connected mode) to the RRC connected mode.

Additional aspects will be set forth in part in the description which follows and, in part, will be apparent from the description, or may be learned by practice of the presented embodiments.

As described above, when the terminal of the next-generation mobile communication system performs state transition, it is necessary to specify operations of protocol layer devices, such as medium access control (MAC), radio link control (RLC), and packet data convergence protocol (PDCP), that are suitable to an RRC inactive mode to be performed or newly introduced, and in case of sending and receiving an RRC message in the RRC inactive mode, specific encryption and decryption procedures in consideration of security are necessary.

In accordance with an aspect of the disclosure, a method of a terminal in a wireless communication system is provided. The method includes receiving, from a base station, a message including information indicating a configuration of a radio resource control (RRC) inactive state, setting a state variable for a packet data convergence protocol (PDCP) entity to an initial value, and discarding a stored PDCP protocol data unit (PDU) for the PDCP entity.

In accordance with another aspect of the disclosure, an efficient protocol layer device operation is proposed to prevent the occurrence of the RRC message exchange for strengthening the security, unnecessary data transmission, and state inconsistency of the protocol layer devices between the terminal and the base station (e.g., whether data has been successfully transferred or state variables) when the terminal of the next-generation mobile communication system performs the state transition from the RRC inactive mode to the RRC connected mode, or from the RRC connected mode to the RRC inactive mode.

In accordance with another aspect of the disclosure, the connection release procedure and the connection setup procedure are specifically proposed in consideration of the security in case where the state transition of the terminal occurs, for example, in case where the terminal is transitioned from the RRC connected mode to the RRC inactive mode, and then is transitioned again to the RRC connected mode, and the operations to be performed by the respective protocol layer devices in the connection release procedure and the connection setup procedure are proposed to solve the problems of the state inconsistency between the protocol layers of the terminal and the base station and the unnecessary retransmission.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
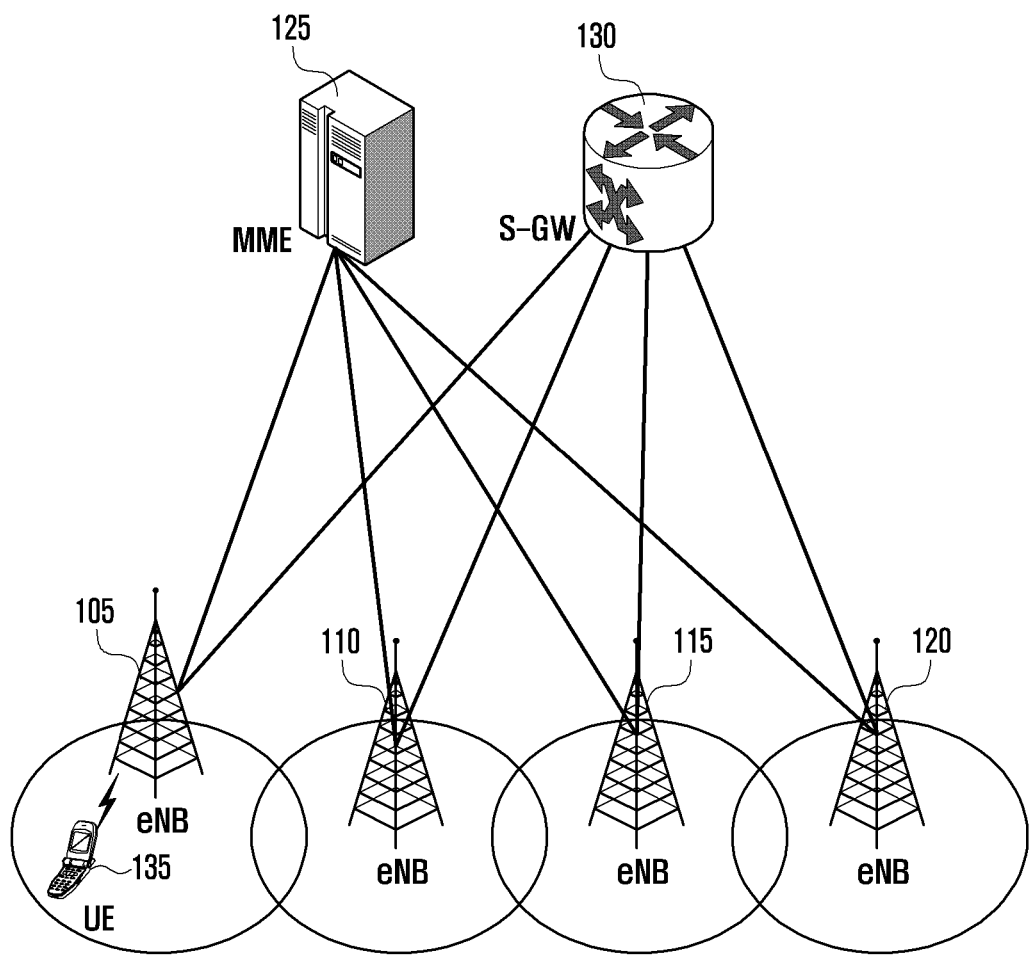
FIG. 1 is a diagram illustrating a structure of a long term evolution (LTE) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments in the present description, explanation of the technical contents that are well-known in the technical fields to which the disclosure pertains and are not directly related to the disclosure will be omitted in the case where it is determined that they obscure the subject matter of the disclosure in unnecessary detail.

For the same reason, in the accompanying drawings, some constituent elements are exaggerated, omitted, or roughly illustrated. Further, sizes of some constituent elements may not completely reflect the actual sizes thereof. In the drawings, the same drawing reference numerals are used for the same elements across various figures.

The aspects and features of the disclosure and methods for achieving the aspects and features will be apparent by referring to the embodiments to be described in detail with reference to the accompanying drawings. However, the disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer-usable or computer-readable memory that can direct a computer or another programmable data processing apparatus to function in a particular manner, such that the instructions stored in the computer-usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~unit", as used in an embodiment, means, but is not limited to, a software or hardware component, such as a field-programmable gate array (FPGA) or an application-specific integrated circuit (ASIC), which performs certain tasks. However, "~unit" does not mean to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units." Further, the components and "~units" may be implemented to operate one or more CPUs in a device or a security multimedia card.

FIG. 1 is a diagram illustrating a structure of a long-term evolution (LTE) system according to an embodiment of the disclosure.

Referring to FIG. 1, as illustrated, a radio access network of an LTE system is composed of evolved node Bs (hereinafter referred to as "ENBs," "node Bs," or "base stations") 105, 110, 115, and 120, a mobility management entity (MME) 125, and a serving-gateway (S-GW) 130. A user equipment (hereinafter referred to as "UE" or "terminal") 135 accesses an external network through the ENBs 105, 110, 115, and 120 and the S-GW 130.

In FIG. 1, the ENBs 105, 110, 115, and 120 corresponds to an existing node B of a universal mobile telecommunications system (UMTS). The ENB is connected to the UE 135 on a radio channel, and plays a more complicated role than that of the existing node B. In the LTE system, since all user traffics including a real-time service, such as a voice over IP (VoIP) through an internet protocol are serviced on shared channels, devices performing scheduling through consolidation of state information, such as a buffer state, an available transmission power state, and a channel state of each UE, are necessary, and the ENBs 105, 110, 115, and 120 correspond to such scheduling devices. In general, one ENB controls a plurality of cells. For example, in order to implement a transmission speed of 100 Mbps, the LTE system uses, for example, orthogonal frequency division multiplexing (OFDM) in a bandwidth of 20 MHz as a radio access technology. Further, the LTE system adopts an adaptive modulation and coding (AMC) scheme that determines a modulation scheme and a channel coding rate to match the channel state of the terminal. The S-GW 130 is a device that provides a data bearer, and generates or removes the data bearer under the control of the MME 125. The MME is a device that takes charge of not only mobility management of the terminal but also various kinds of control functions, and is connected to the plurality of base stations.

Figure 2:
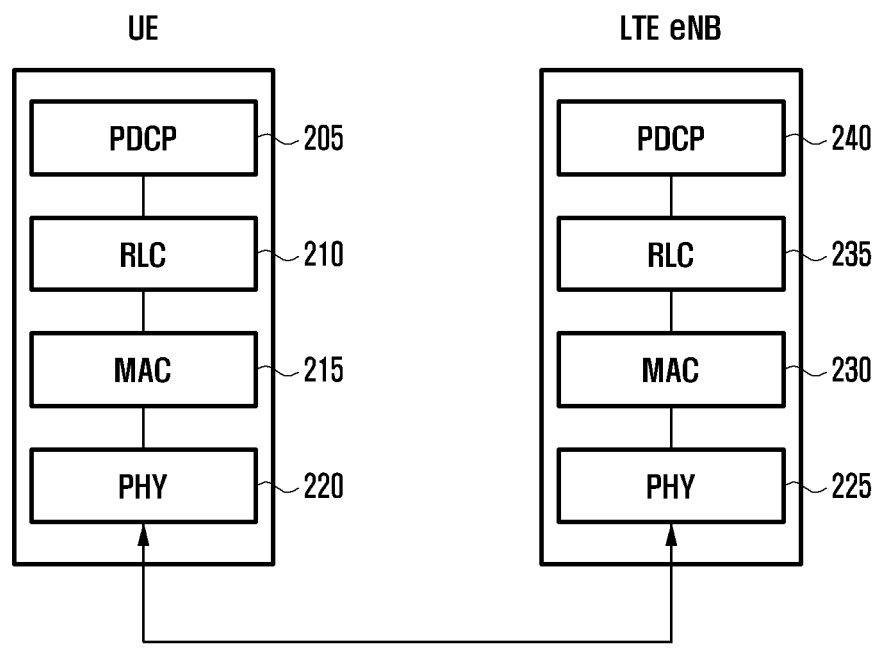
FIG. 2 is a diagram illustrating a radio protocol structure in an LTE system according to an embodiment of the disclosure.

FIG. 2 is a diagram illustrating a radio protocol structure in an LTE system according to an embodiment of the disclosure.

Referring to FIG. 2, in a UE or an ENB, a radio protocol of an LTE system is composed of a packet data convergence protocol (PDCP) 205 or 240, a radio link control (RLC) 210 or 235, and a medium access control (MAC) 215 or 230. The PDCP 205 or 240 takes charge of IP header compression/decompression operations. The main functions of the PDCP are summarized as follows:

Header compression and decompression: ROHC only;
Transfer of user data;
In-sequence delivery of upper layer PDUs at a PDCP reestablishment procedure for RLC AM;
For split bearers in DC (only support for RLC AM): PDCP PDU routing for transmission and PDCP PDU reordering for reception;
Duplicate detection of lower layer service data units (SDUs) at PDCP reestablishment procedure for RLC AM;
Retransmission of PDCP SDUs at handover and, for split bearers in DC, of PDCP PDUs at PDCP data-recovery procedure, for RLC AM;
Ciphering and deciphering; and
Timer-based SDU discard in an uplink.

The radio link control (hereinafter referred to as "RLC") 210 or 235 reconfigures a PDCP protocol data unit (PDU) with a proper size and performs an ARQ operation. The main functions of the RLC are summarized as follows:

Transfer of upper layer PDUs;
Error correction through ARQ (only for AM data transfer);
Concatenation, segmentation, and reassembly of RLC SDUs (only for UM and AM data transfer);
Re-segmentation of RLC data PDUs (only for AM data transfer);
Reordering of RLC data PDUs (only for UM and AM data transfer);
Duplicate detection (only for UM and AM data transfer);
Protocol error detection (only for AM data transfer);
RLC SDU discard (only for UM and AM transfer); and
RLC reestablishment.

The MAC 215 or 230 is connected to several RLC layer devices configured in one terminal, and performs multiplexing/demultiplexing of RLC PDUs into/from MAC PDU. The main functions of the MAC are summarized as follows:

Mapping between logical channels and transport channels;
Multiplexing/demultiplexing of MAC SDUs belonging to one or different logical channels into/from transport blocks (TB) delivered to/from the physical layer on transport channels;
Scheduling information reporting;
HARQ function (error correction through HARQ);
Priority handling between logical channels of one UE;
Priority handling between UEs by means of dynamic scheduling;
MBMS service identification;
Transport format selection; and
padding.

A physical layer 220 or 225 performs channel coding and modulation of upper layer data to configure and transmit OFDM symbols to a radio channel, or performs demodulation and channel decoding of the OFDM symbols received on the radio channel to transfer the demodulated and channel-decoded data to an upper layer.

Figure 3:
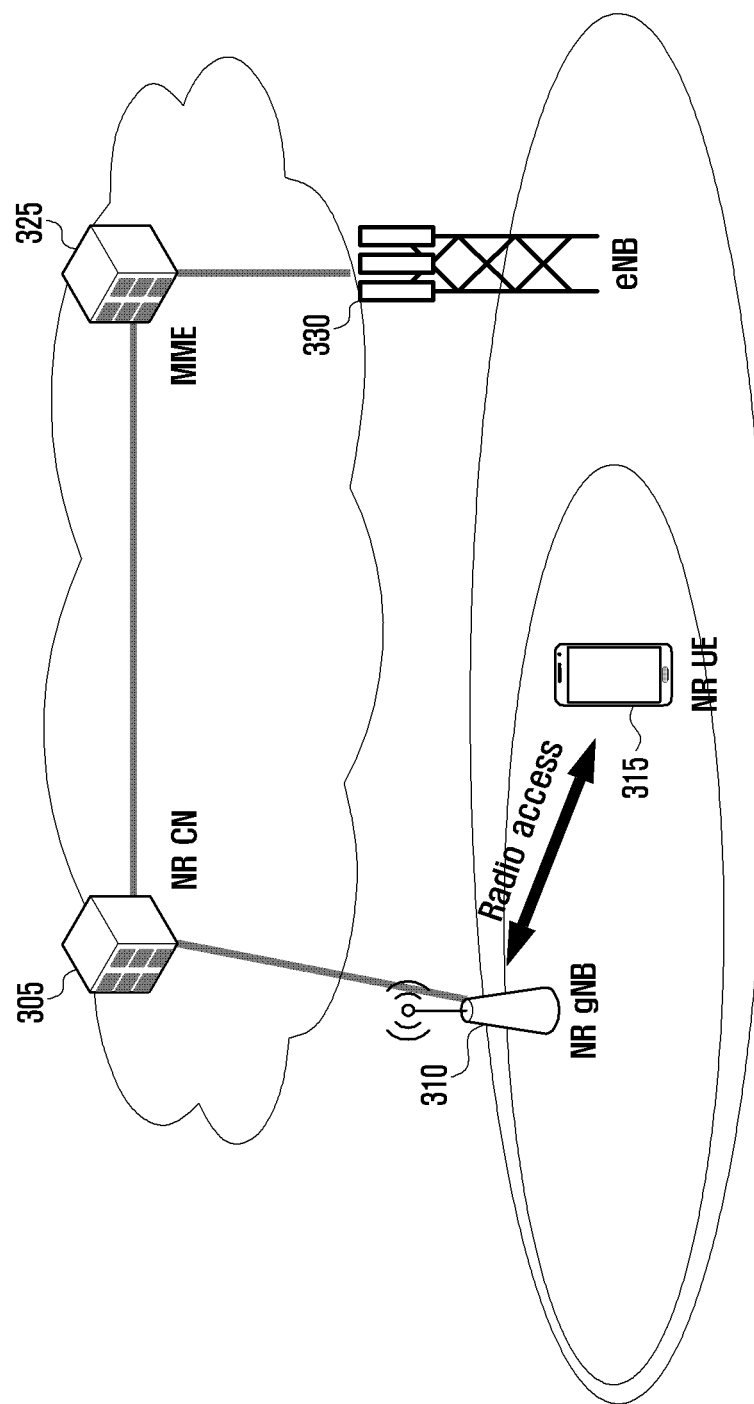
FIG. 3 is a diagram illustrating a structure of a next-generation mobile communication system according to an embodiment of the disclosure.

FIG. 3 is a diagram illustrating a structure of a next-generation mobile communication system according to an embodiment of the disclosure.

Referring to FIG. 3, as illustrated, a radio access network of a next-generation mobile communication system (hereinafter referred to as "NR" or "5G") is composed of a new radio node B (hereinafter referred to as "NR gNB" or "NR ENB") 310 and a new radio core network (NR CN) 305. A new radio user equipment (hereinafter referred to as "NR UE" or "terminal") 315 accesses an external network through the NR gNB 310 and the NR CN 305.

In FIG. 3, the NR gNB 310 corresponds to an evolved node B (ENB) of the existing LTE system. The NR gNB is connected to the NR UE 315 on a radio channel, and thus it can provide a more superior service than the service of the existing node B. Since all user traffics are serviced on shared channels in the next-generation mobile communication system, a device that performs scheduling through consolidation of status information, such as a buffer state, an available transmission power state, and a channel state of each UE, is necessary, and the NR gNB 310 takes charge of this. One NR gNB generally controls a plurality of cells. In order to implement ultra-high-speed data transmission as compared with the existing LTE, the NR gNB or cell may have the existing maximum bandwidth or more, and a beamforming technology may be additionally grafted in consideration of orthogonal frequency division multiplexing (OFDM) as a radio connection technology. Further, an adaptive modulation and coding (AMC) scheme determining a modulation scheme and a channel coding rate to match the channel state of the UE is adopted. The NR CN 305 performs functions of mobility support, bearer configuration, and quality of service (QoS) configuration. The NR CN is a device taking charge of not only terminal mobility management but also various kinds of control functions, and is connected to a plurality of ENBs. Further, the next-generation mobile communication system may also interlock with the existing LTE system, and the NR CN is connected to an MME 325 through a network interface. The MME is connected to an ENB 330 that is an existing base station.

Figure 4:
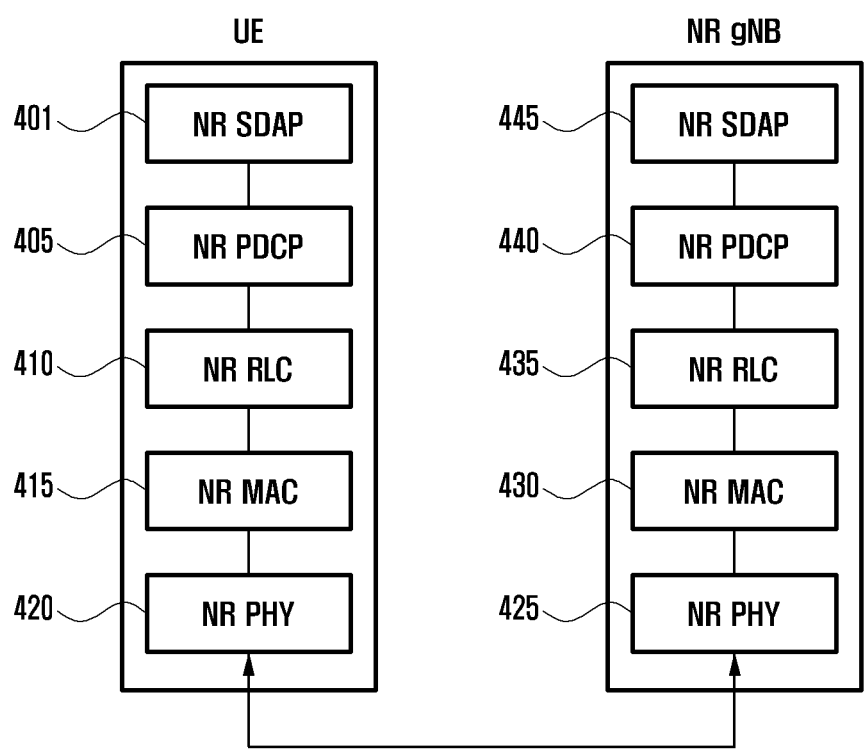
FIG. 4 is a diagram illustrating a radio protocol structure of a next-generation mobile communication system according to an embodiment of the disclosure.

FIG. 4 is a diagram illustrating a radio protocol structure of a next-generation mobile communication system according to an embodiment of the disclosure.

Referring to FIG. 4, in a UE or an NR ENB, a radio protocol of the next-generation mobile communication system is composed of a new radio service data adaptation protocol (NR SDAP) 401 or 445, a new radio packet data convergence protocol (NR PDCP) 405 or 440, a new radio link control (NR RLC) 410 or 435, and a new radio medium access control (NR MAC) 415 or 430.

The main function of the NR SDAP 401 or 445 may include parts of the following functions:

Transfer of user plane data;
Mapping between a QoS flow and a data radio bearer (DRB) for both DL and UL;
Marking QoS flow ID in both DL and UL packets; and
Reflective QoS flow to DRB mapping for the UL SDAP PDUs.

With respect to the SDAP layer device, the terminal may receive, through an RRC message, configuration of whether to use a header of the SDAP layer device or whether to use the function of the SDAP layer device by PDCP layer devices, bearers, or logical channels, and if the SDAP header is configured, the terminal may indicate to update or reconfigure mapping information on the QoS flow and the data bearer of an uplink and a downlink through a non-access stratum (NAS) QoS reflective configuration 1-bit indicator (NAS reflective QoS) and an access stratum (AS) QoS reflective configuration 1-bit indicator (AS reflective QoS) of the SDAP header. The SDAP header may include QoS flow ID information indicating the QoS. The QoS information may be used as data processing priority and scheduling information for supporting smooth services.

The main function of the NR PDCP 405 or 440 may include parts of the following functions:

Header compression and decompression: ROHC only;
Transfer of user data;
In-sequence delivery of upper layer PDUs;
Out-of-sequence delivery of upper layer PDUs;
PDCP PDU reordering for reception;
Duplicate detection of lower layer SDUs;
Retransmission of PDCP SDUs;
Ciphering and deciphering; and
Timer-based SDU discard in uplink.

As described above, reordering of the NR PDCP devices may mean reordering of PDCP PDUs received from a lower layer based on PDCP sequence numbers (SNs), and the reordering of the NR PDCP devices may include delivery of data to an upper layer in the order of the reordering, or may include direct delivery of data without considering the order. Further, the reordering of the NR PDCP devices may include recording of the lost PDCP PDUs through the reordering, status report for the lost PDCP PDUs to a transmission side, and request for retransmission of the lost PDCP PDUs.

The main function of the NR RLC 410 or 435 may include parts of the following functions:
Transfer of upper layer PDUs;
In-sequence delivery of upper layer PDUs;
Out-of-sequence delivery of upper layer PDUs;
Error correction through ARQ;
Concatenation, segmentation, and reassembly of RLC SDUs;
Re-segmentation of RLC data PDUs;
Reordering of RLC data PDUs;
Duplicate detection;
Protocol error detection;
RLC SDU discard; and
RLC reestablishment.

As described above, in-sequence delivery of NR RLC devices may mean in-sequence delivery of RLC SDUs received from a lower layer to an upper layer. In the case where one original RLC SDU is segmented into several RLC SDUs to be received, the in-sequence delivery of the NR RLC devices may include reassembly and delivery of the RLC SDUs. Further, the in-sequence delivery of the NR RLC devices may include reordering of the received RLC PDUs based on an RLC SN or a PDCP SN, and recording of lost RLC PDUs through reordering. Further, the in-sequence delivery of the NR RLC devices may include performing of status report for the lost RLC PDUs to a transmission side, and request for retransmission of the lost PDCP PDUs. Further, the in-sequence delivery of the NR RLC devices may include in-sequence delivery of only RLC SDUs just before the lost RLC SDUs to an upper layer if there are the lost RLC SDUs. Further, the in-sequence delivery of the NR RLC devices may include in-sequence delivery of all the RLC SDUs received before a specific timer starts its operation to an upper layer if the timer has expired although there are the lost RLC SDUs, or in-sequence delivery of all the RLC SDUs received up to now to an upper layer if the timer has expired although there are the lost RLC SDUs. Further, the RLC PDUs may be processed in the order of their reception (regardless of the order of the SN, but in the order of their arrival), and then they may be transferred to a PDCP device in an out-of-sequence delivery manner. In case of segments, the segments stored in a buffer or to be received later are received and reconfigured into one complete RLC PDU to be processed and transferred to the PDCP device. The NR RLC layer may not include a concatenation function, and the function may be performed by an NR MAC layer or may be replaced by a multiplexing function of the NR MAC layer.

As described above, the out-of-sequence delivery by the NR RLC device means a function of transferring the RLC SDUs received from a lower layer directly to an upper layer regardless of the order of the received RLC SDUs. If the one original RLC SDU is segmented into several RLC SDUs to be received, the out-of-sequence delivery may include reassembly and delivery of the RLC SDUs, and recording of the lost RLC PDUs through storing and ordering the RLC SNs or PDCP SNs of the received RLC PDUs.

The NR MAC 415 or 430 may be connected to several NR RLC layer devices configured in one terminal, and the main functions of the NR MAC may include parts of the following functions:
Mapping between logical channels and transport channels;
Multiplexing/demultiplexing of MAC SDUs;
Scheduling information reporting;
HARQ function (error correction through HARQ);
Priority handling between logical channels of one UE;
Priority handling between UEs by means of dynamic scheduling;
MBMS service identification;
Transport format selection; and
padding.

A new radio physical (NR PHY) layer 420 or 425 may perform channel coding and modulation of upper layer data to make and transmit OFDM symbols on a radio channel, or may perform demodulation and channel decoding of the OFDM symbols received on the radio channel to transfer the demodulated and channel-decoded data to an upper layer.

Figure 5:
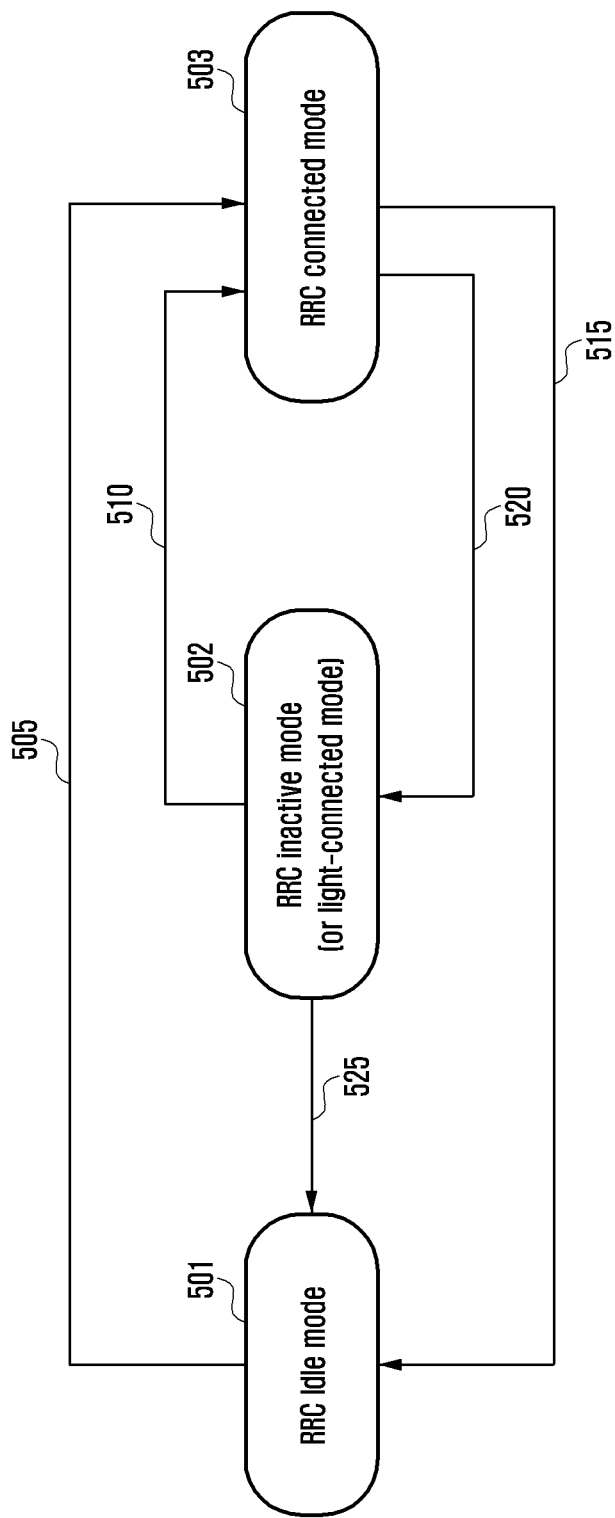
FIG. 5 is a diagram illustrating modes in which a terminal can remain in a next-generation mobile communication system according to an embodiment of the disclosure.

FIG. 5 is a diagram illustrating modes in which a terminal can remain in a next-generation mobile communication system according to an embodiment of the disclosure.

Referring to FIG. 5, a terminal (UE) may remain in an RRC connected mode 503, an RRC inactive mode (or a lightly-connected mode) 502, and an RRC idle mode 501, and may pass through processes of a switchover to different modes 505, 510, 515, 520, and 525. That is, the terminal in the RRC idle mode 501 may be switched to the RRC connected mode 503 (switchover to different mode process 505) in order to transmit and receive data if data to be transmitted to an uplink is generated, if a paging message is received through arrival of downlink data, or if a connection with the network is configured to update a tracking area (periodically or if the UE deviates from the tracking area). If data is not generated for a predetermined time after the data is transmitted or received, the terminal in the RRC connected mode can be switched to the RRC idle mode by the network (switchover to different mode process 515). Further, if data is not generated for a predetermined time, the terminal in the RRC connected mode 503 may be switched to the RRC inactive mode 502 by the network or by itself for the purpose of battery saving and fast connection support (switchover to different mode process 520). If data to be transmitted to an uplink is generated, if a paging message is received through arrival of downlink data, or if a connection with the network is configured to update a tracking area (or RAN notification area) (periodically or if the terminal deviates from the tracking area (or RAN notification area)), the terminal in the RRC inactive mode 502 may be switched to the RRC connected mode 503 (switchover to different mode process 510). The terminal in the RRC inactive mode 502 may be switched to the RRC idle mode 501 by indication of the network, by pre-engaged configuration, or by itself (switchover to different mode process 525). If many terminals in the RRC inactive mode exist in the network, this may cause signaling overhead of the network to be increased due to frequent updating of the RAN notification area, and thus switchover of the terminals in the RRC inactive mode to the RRC idle mode should be supported. In case of the terminal having a specific purpose, it may transmit data even in the RRC inactive mode 502 without being switched to the RRC connected mode 503, repeat transition in accordance with the indication of the network between the RRC inactive mode and the RRC idle mode, and proceed to be transitioned to the RRC connected mode only in case of need. In the above-described procedure, since the terminal in the RRC inactive mode transmits data in the RRC inactive mode, it has the advantage that it has a very short transmission delay and very small signaling overhead. In case of transmitting only a small amount of data, the terminal having the specific purpose may correspond to the terminal transmitting data intermittently or periodically in a very long period. Further, the terminal in the RRC idle mode 501 may be directly transitioned to the RRC inactive mode 502 by the network, or may be transitioned to the RRC connected mode and then may be transitioned to the RRC inactive mode (switchover to different mode processes 505 and 520).

In order to solve the state mismatch problem between the mode of the terminal that performs transition between the modes and the mode of the terminal that is recognized by the network, an inactive timer may be additionally configured to be driven in the terminal. Further, such an inactive timer may also be driven even in the ENB.

In the disclosure, the RRC inactive mode and the lightly-connected mode may be interpreted as the same state mode, and it may be assumed that the terminal performs the same operation. Further, the RRC inactive mode and the lightly-connected mode may be interpreted as the same state mode, but it may be assumed that the terminal performs different operations in the respective modes. Further, the RRC inactive mode and the lightly-connected mode may be interpreted as different state modes, and it may be assumed that the terminal performs different operations in the respective modes. Although the RRC inactive mode and the lightly-connected mode have the same purpose on the point that fast re-connection is possible with small signaling and the battery can be saved, they may be the same modes or different modes depending on implementation of the terminal and the network and their definition. Further, the terminal operation in the RRC inactive mode and the lightly-connected mode may be the same as the operation in the RRC idle mode, may have an additional function, or may have only a partial function of the operation in the RRC idle mode. As described above, in the RRC inactive mode, the terminal battery can be saved, and when the terminal is connected to the network, fast connection can be configured with a small signaling overhead. However, the terminal in the RRC inactive mode should perform a procedure for updating the RAN notification area more frequently than a procedure in which the terminal in the RRC idle mode periodically updates the tracking area. Accordingly, if many terminals in the RRC inactive mode exist in the network, this may cause the signaling overhead due to the procedure for periodically updating the RAN notification area, and thus it is necessary for the network to manage the terminals in the RRC inactive mode and, if needed, to switch the terminals in the RRC inactive mode to the RRC idle mode.

Figure 6:
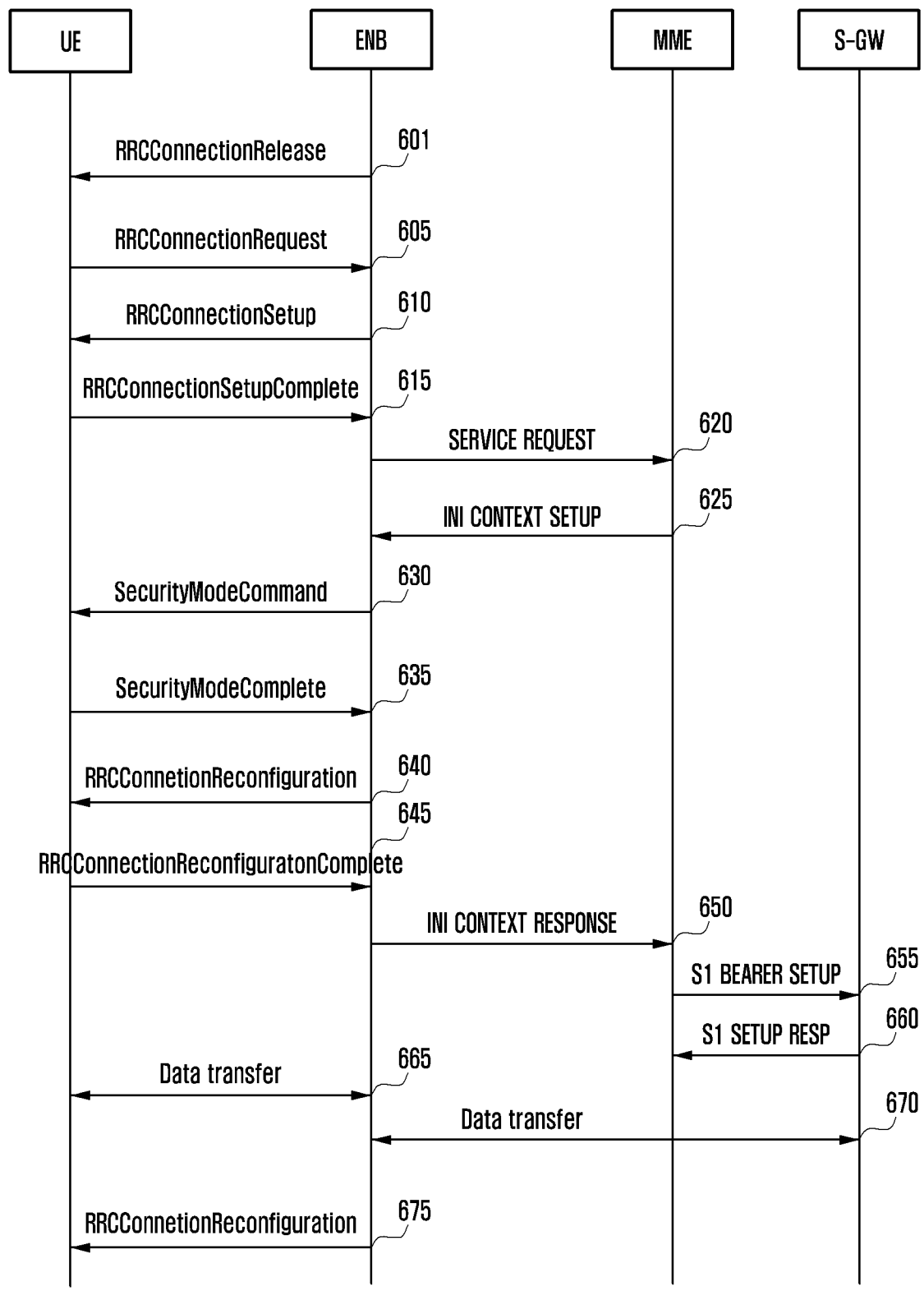
FIG. 6 is a diagram explaining a procedure in which a terminal is transitioned from a radio resource control (RRC) connected mode to an RRC idle mode and a procedure in which a terminal is transitioned from an RRC idle mode to an RRC connected mode according to an embodiment of the disclosure.

FIG. 6 is a diagram explaining a procedure in which a terminal is switched from an RRC connected mode to an RRC idle mode and a procedure in which the terminal is switched from the RRC idle mode to the RRC connected mode according to an embodiment of the disclosure.

Referring to FIG. 6, if a terminal (UE) transmitting and receiving data in the RRC connected mode does not transmit and receive the data for a specific cause or for a predetermined time, a base station (ENB) may transmit an RRCConnectionRelease message to the UE to make the UE switch to the RRC idle mode, at operation 601. Thereafter, if data to be transmitted is generated, the UE of which the connection is not currently configured (hereinafter referred to as "idle mode UE") performs an RRC connection establishment process with the ENB. The UE establishes backward transfer synchronization with the ENB through a random access process, and transmits an RRCConnectionRequest message to the ENB, at operation 605. The message contains therein an identifier of the UE and a connection establishment cause. The ENB transmits an RRCConnectionSetup message to the UE so that the UE sets the RRC connection, at operation 610. The message contains RRC connection setup information and so on. The RRC connection is also called a signaling radio bearer (SRB), and is used to transmit and receive an RRC message that is a control message between the UE and the ENB. The UE having the RRC connection setup transmits an RRCConnectionSetupComplete message to the ENB, at operation 615. The message contains a control message SERVICE REQUEST for the UE to request a bearer setup for a specific service from an MME. The ENB transmits the SERVICE REQUEST message contained in the RRCConnectionSetupComplete message to the MME, at operation 620, and the MME determines whether to provide the service requested by the UE. If it is determined to provide the service requested by the UE as the result of the determination, the MME transmits an INITIAL CONTEXT SETUP REQUEST message to the ENB, at operation 625. The message includes quality of service (QoS) information to be applied during data radio bearer (DRB) setup and security related information (e.g., security key and security algorithm) to be applied to the DRB. In order to set the security with the UE, the ENB exchanges a SecurityModeCommand message and a SecurityModeComplete message with the UE, at operations 630 and 635. If the security setup is completed, the ENB transmits an RRCConnectionReconfiguration message to the UE, at operation 640. The message includes setup information of the DRB whereby user data is to be processed, and the UE sets the DRB by applying the information, and transmits an RRCConnectionReconfigurationComplete message to the ENB, at operation 645. The ENB that has completed the DRB setup with the UE transmits an INITIAL CONTEXT SETUP COMPLETE message to the MME, at operation 650, and the MME that has received this exchanges an S1 BEARER SETUP message and an S1 BEARER SETUP RESPONSE message with an S-GW in order to set the S1 bearer, at operations 655 and 660. The S1 bearer is a connection for transmitting data set between the S-GW and the ENB, and corresponds to the DRB in a one-to-one manner. If the above-described process is completed, the UE transmits and receives data with the ENB through the S-GW, at operations 665 and 670. As described above, a general data transmission process is briefly composed of three stages of RRC connection setup, security setup, and DRB setup. Further, the ENB may transmit the RRCConnectionReconfiguration message to the UE in order to renew, add, or change the setup for a specific cause, at operation 675.

As described above, in order to perform switching from the RRC idle mode to the RRC connected mode, many signaling procedures are required. Accordingly, in the next-generation mobile communication system, the RRC inactive mode or the lightly-connected mode may be newly defined, and in such a new mode, the UE and the ENB store a UE context. If needed, the S1 bearer can be maintained, and thus faster connection can be made with a small number of signaling procedures.

Figure 7:
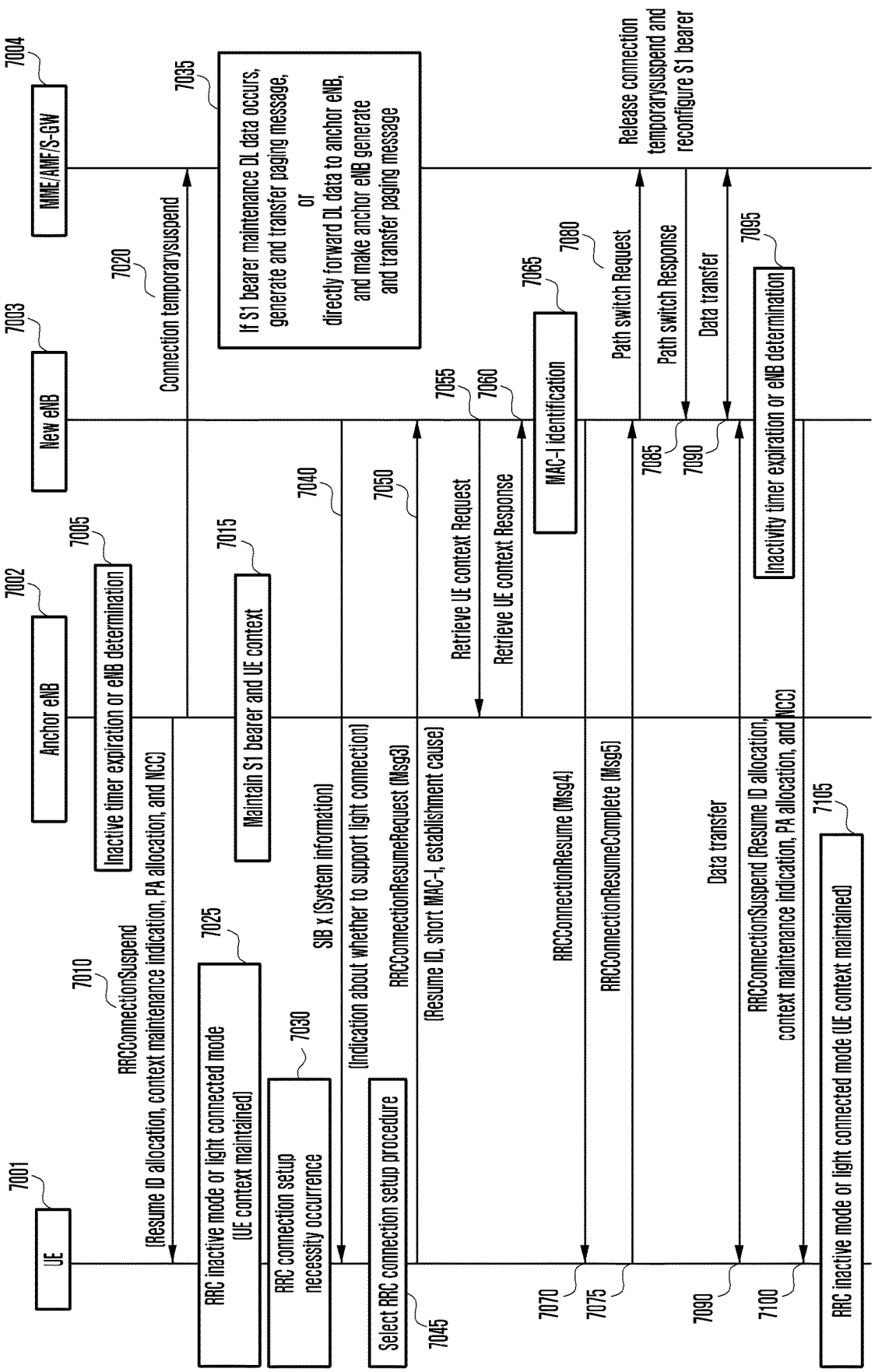
FIG. 7 is a diagram explaining a procedure in which a terminal is transitioned from an RRC connected mode to an RRC inactive mode (or lightly-connected mode) and a procedure in which a terminal is transitioned from an RRC inactive mode (or lightly-connected mode) to an RRC connected mode according to an embodiment of the disclosure.

FIG. 7 is a diagram explaining a procedure in which a terminal is switched from an RRC connected mode to an RRC inactive mode (or a lightly-connected mode) and a procedure in which the terminal is switched from the RRC inactive mode (or the lightly-connected mode) to the RRC connected mode according to an embodiment of the disclosure.

Referring to FIG. 7, an overall flow among a terminal (UE) 7001, an anchor eNB 7002, a new eNB 7003, and an MME 7004 in order to perform a procedure of reusing a UE context and an S1 bearer between the UE and the eNB, is illustrated. The UE 7001 in an RRC connected state transmits and receives data with the eNB. If the data transmission and reception is interrupted, the eNB operates a specific timer, and if the data transmission and reception is not resumed until the timer expires, at operation 7005, the eNB may consider release of the RRC connection of the UE, and the eNB may determine whether to switch the UE to the RRC idle mode or the RRC inactive mode in accordance with a specific condition. As the above-described specific condition, the degree of the network traffic, the amount of UE context that the network can maintain, and the number of UEs for which the network can support services may be considered. At operation 7010, in order to switch the UE to the RRC inactive state or the light connected state, the eNB may transmit an RRCConnectionRelease or RRCConnectionSuspend message, a newly defined RRC message, or another existing reused RRC message. At operation 7010, the eNB may store the UE context after releasing the RRC connection of the UE in accordance with a specific rule, may allocate a resume ID while transmitting a control message indicating to release the RRC connection to the UE, and may configure a paging area (PA) in which the UE is to report mobility during the light connected mode. In this case, through the resume ID allocation, the UE can know that it should store the UE context, or the eNB may include a separate context maintenance indication for indicating that the UE operates in the RRC inactive mode/light connected mode and the UE context should be stored in the above-described message to be transmitted, at operation 7010. Further, the message may include security information for updating the security setup that is necessary when the UE performs an RRC connection resume procedure. For example, a NextHopChainingCount (NCC) may be pre-allocated, and using this, a new security key KeNB* or KgNB* may be calculated and configured. Further, the control message may include a list of cells to which a procedure of using the stored context can be applied in a period in which the eNB maintains the context or when the UE intends to reconfigure the RRC connection in an effective period. After releasing the RRC connection of the UE, the eNB maintains the UE context of the UE and the S1 bearer as they are, at operation 7015. The S1 bearer calls an S1-control bearer used to send and receive a control message between the eNB and the MME and an S1-user plane bearer used to send and receive user data between the eNB and the S-GW. By maintaining the S1 bearer, a procedure for S1 bearer setup can be omitted when the UE intends to set the RRC connection in the same cell or in the same eNB. If the effective period expires, the eNB may delete the UE context and may release the S1 bearer. The UE, which has received the RRCConnectionRelease message at operation 7010, is switched to the RRC inactive mode/light connected mode.

As described above, the anchor eNB means an eNB that manages an RAN paging area (or RAN notification area) in order to manage mobility of the UE in the RRC inactive mode. The role of the anchor eNB as described above may be performed by an access and mobility management function (AMF) device instead.

The eNB transmits a control message for requesting a connection temporary suspend from the MME to the MME, at operation 7020. If downlink data for the UE is generated, the MME that has received the control message may make the S-GW transfer the downlink data directly to the anchor eNB, and may make the anchor eNB generate and transfer a paging message to neighboring eNBs, at operation 7035. That is, the anchor eNB that has received the downlink data stores the data in a buffer and proceeds with a paging procedure. The anchor eNB calls an eNB that maintains the UE context of the UE and an S1-U bearer. If the UE does not respond to the paging message sent by the anchor eNB, that is, if paging has failed, the anchor eNB may request the paging procedure from the MME, and may request the MME to start the paging procedure without transferring the downlink data for the UE generated by the S-GW to the eNB, and the S-GW may operate accordingly, at operation 7035.

The UE that has received the RRCConnectionRelease message at operation 7010 including information indicating context maintenance and a resume ID may release the RRC connection, but may operate the timer corresponding to the effective period, record a list of effective cells in a memory, maintain the current UE context in the memory without deleting the same, at operation 7025, and be transitioned to the light connected mode. The UE context as described above means various kinds of information related to the RRC setup of the UE, and includes SRB setup information, DRB setup information, and security key information. Thereafter, for a certain cause, there occurs necessity to set the RRC connection, at operation 7030. The UE to which the resume ID was not allocated in the previous RRC connection release process or for which context maintenance has not been indicated may start the general RRC connection setup process (see FIG. 6) as described above with reference to FIG. 6, whereas the UE in the RRC inactive mode/light connected mode, to which the resume ID was allocated in the previous RRC connection release process may attempt the RRC connection resume process using the stored UE context. The UE in the RRC inactive mode/light connected mode as described above may perform the general RRC connection setup process (see FIG. 6) and may perform the RRC connection resume process using the stored UE context depending on whether the RRC inactive mode/light connection of the network can be supported. That is, if the RRC inactive mode/light connected mode is not supported, the UE may perform the general RRC connection setup process (see FIG. 6), whereas if the RRC inactive mode/light connected mode is supported, the UE may perform the RRC connection resume procedure as follows. As described above, the RRC inactive mode may be always supported by the network (accordingly, the system information may not separately notify of whether to support the RRC inactive mode/light connected mode). In the disclosure, each eNB or each cell may include an indication indicating whether the eNB or the cell supports the light connection in the system information to be transmitted. The indication may be included in the second block Systeminformation2 of the system information, and may be included in blocks Systeminformation1~19 of the other system information. Support of the light connection as described above may mean that the corresponding eNB or cell can set and support operations

7050, 7055, 7060, 7065, 7070, 7075, 7080, 7085, and 7090 described below. If there is necessity to set the RRC connection, the UE in the light connected mode reads the system information of the cell that is currently in a camp-on state. If the system information received by the UE at operation 7040 does not include the indication indicating that the eNB or cell supports the light connection (or RRC inactive mode), the UE may perform the general RRC connection setup process (see FIG. 6) as described above with reference to FIG. 6, at operation 7045. However, if the system information received by the UE at operation 7040 includes the indication indicating that the eNB or cell supports the light connection (or RRC inactive mode), the UE may perform the RRC connection resume process using the stored UE context, at operation 7045. The RRC connection resume process using the stored UE context is described below.

First, the UE transmits a preamble on message 1 in order to perform a random access procedure. If resource allocation is possible in accordance with the preamble received on message 1, the eNB allocates a corresponding uplink resource to the UE on message 2. The UE transmits a resume request message including the resume ID received at operation 7010 based on the received uplink resource information, at operation 7050. The message may be a modified message of the RRCConnectionRequest message or a newly defined message (e.g., RRCConnectionResumeRequest message). If the UE that is in the light connected mode through connection release by the anchor eNB moves to be in the camp-on state in the cell of another eNB, the new eNB 7003 can know from what eNB the corresponding UE previously received the service through reception and identification of the resume ID of the UE. If the new eNB 7003 has successfully received and identified the resume ID, it performs a context retrieve procedure for retrieving the UE context from the anchor eNB, at operations 7055 and 7060. If the UE context retrieve procedure has failed for a specific cause, for example, if the anchor/source eNB cannot be found or if the UE context does not exist, the eNB may transmit the RRCConnectionSetup message as illustrated in FIG. 6 instead of the RRCConnectionResume message, and may fall back on the RRC connection setup procedure as described above with reference to FIG. 6 as the subsequent bearer setup procedure/security setup procedure. Further, the eNB may complete the security setup, send the UE to the RRC connected mode, or make the UE return to the RRC inactive mode as sending the RRCConnectionSuspend message together with a new UE identification (resume ID) and an RAN paging area. The new eNB 7003 may bring the UE context from the anchor eNB 7002 through an S1 or X2 interface. In case where the new eNB has received the resume ID, but has not successfully discriminated the UE for a specific cause, it may send the RRCConnectionSetup message to the UE to fall back on the general RRC connection setup procedure as described above with reference to FIG. 6. That is, the eNB may send the RRCConnectionSetup message to the UE, and the UE that has received the message may send an RRCConnectionSetupComplete message to the eNB to perform the connection setup. Further, if the new eNB has received the resume ID, but has not successfully discriminated the UE (e.g., retrieval of the UE context from the anchor eNB has failed), it may send an RRCConnectionRelease message or an RRCConnectionReject message to the UE to reject the connection of the UE, and may again attempt to start the general RRC connection setup procedure as described above with reference to FIG. 6. The new eNB identifies MAC-I based on the retrieved UE context, at operation 7065. The MAC-I is a message authentication code calculated by the UE with respect to the control message through application of the security information of the restored UE context, that is, through application of a security key and a security counter. The eNB identifies integrity of the message using the MAC-I of the message and the security key and the security counter stored in the UE context. Further, the new eNB determines the setup to be applied to the RRC connection of the UE, and transmits the RRCConnectionResume message containing the setup information to the UE, at operation 7070. The eNB may identify the resume ID of the UE and may cipher the RRCConnectionResume message using a new security key KeNB* or KgNB* to transmit the ciphered RRCConnectionResume message, and the UE may normally receive the RRCConnectionResume message through deciphering of the RRCConnectionResume message using the new security key KeNB* or KgNB* calculated using the NCC pre-allocated, at operation 7010. After the procedure of sending the RRCConnectionResume message, the RRC message and data may be ciphered by the new security key, and may be transmitted and received by the UE and the eNB. The RRCConnectionResume message may be a control message obtained by including information (REUSE INDICATOR) indicating "RRC context reuse" in the general RRC connection request message. The RRCConnectionResume message contains various kinds of information related to the RRC connection setup of the UE in the same manner as the RRCConnectionSetup message. If the UE receives the general RRCConnectionSetup message, it sets the RRC connection based on the setup information indicated in the RRCConnectionSetup message, whereas if the UE receives the RRCConnectionResume message, it sets the RRC connection (delta configuration) in consideration of both the stored setup information and the setup information indicated in the control message. For example, the UE may determine the setup information to be applied by determining the indicated setup information as delta information for the stored setup information, and may update the setup information or the UE context. For example, if SRB setup information is included in the RRCConnectionResume message, the UE configures the SRB through application of the indicated SRB setup information, whereas if the SRB setup information is not included in the RRCConnectionResume message, the UE configures the SRB through application of the SRB setup information stored in the UE context.

The UE configures the RRC connection by applying the updated UE context and setup information, and transmits an RRCConnectionResumeComplete message to the eNB, at operation 7075. Further, the eNB transmits a control message for requesting a connection temporary suspend release to the MME, and requests the MME to reconfigure the S1 bearer to the new eNB, at operations 7080 and 7085. If the above-described message is received, the MME requests the S-GW to reconfigure the S1 bearer to the new eNB, and indicates to normally process the data for the UE. If the above-described process is completed, the UE resumes data transmission and reception in the above-described cell, at operation 7090.

In the above-described procedure, if the anchor eNB releases the connection and the UE in the light connected mode does not move greatly to be again in the camp-on state in the cell of the anchor eNB 7002, the new eNB 7003 may perform only the connection temporary suspend release of the S1 bearer instead of the procedures at operations 7080 and 7085 without performing the procedures at operations 7055 and 7060, search for the UE context of the UE with reference to the resume ID indicated in message3, and based on this, reconfigure the connection in a method similar to the above-described procedures.

If the data transmission and reception is interrupted, the eNB operates a specific timer, and if the data transmission and reception is not resumed until the timer expires, at operation 7095, the eNB considers release of the RRC connection of the UE. At operation 7100, in order to switch the UE to the RRC inactive state or the light connected state, the eNB may reuse and transmit an RRCConnectionRelease or RRCConnectionSuspend message, a newly defined RRC message, or another existing RRC message. At operation 7100, the eNB may store the UE context after releasing the RRC connection of the UE in accordance with a specific rule, may allocate the resume ID as transmitting the control message indicating to release the RRC connection to the UE, and may configure a RAN paging area or RAN notification area in which the UE is to report mobility during the RRC inactive mode (or light connected mode), at operation 7100. If the UE, in operation 7105, in the RRC inactive mode (or light connected mode) deviates from the configured RAN paging area, it performs an RAN paging area updating procedure.

In the next-generation mobile communication system, the eNB may configure the UE in the RRC inactive mode, and may configure the RAN paging area or RAN notification area in order for the UE to report the terminal identification (resume ID) that can be used later when the RRC connection is attempted and the terminal mobility. Further, the eNB may configure an NCC value for security setup to be used in the subsequent connection setup process.

In the next-generation mobile communication system, the RRC-inactivated eNB performs a tracking area update (TAU) if it deviates from a tracking area (TA) or TA list configured in network/MME/core network (CN), and performs an RAN paging area update if it deviates from an RAN paging area or an RAN notification area configured by an AMF or anchor eNB. The network may send various messages as a response in accordance with the situation of the network when the UE in the RRC inactive mode performs the RAN paging area update.

Next, according to the disclosure, more specific embodiments of a procedure of solving the problems of the state inconsistency between the protocol layers of the terminal and the base station and the unnecessary retransmission are proposed based on the above-described procedures by specifically proposing the connection release procedure and the connection setup procedure in consideration of the security in case where the state transition of the terminal occurs, for example, in case where the terminal is transitioned from the RRC connected mode to the RRC inactive mode, and then is transitioned again to the RRC connected mode, and by specifically proposing the operations to be performed by the respective protocol layer devices in the connection release procedure and the connection setup procedure.

Next, according to the disclosure, the RRCConnectionRelease message as described above may be used as the RRCRelease message, and the RRCConnectionResumeRequest message may be used as the RRCResumeRequest message. Further, the RRCConnectionResume message may be used as the RRCResume message, and the RRCConnectionResumeComplete message may be used as the RRCResumeComplete message.

Figure 8:
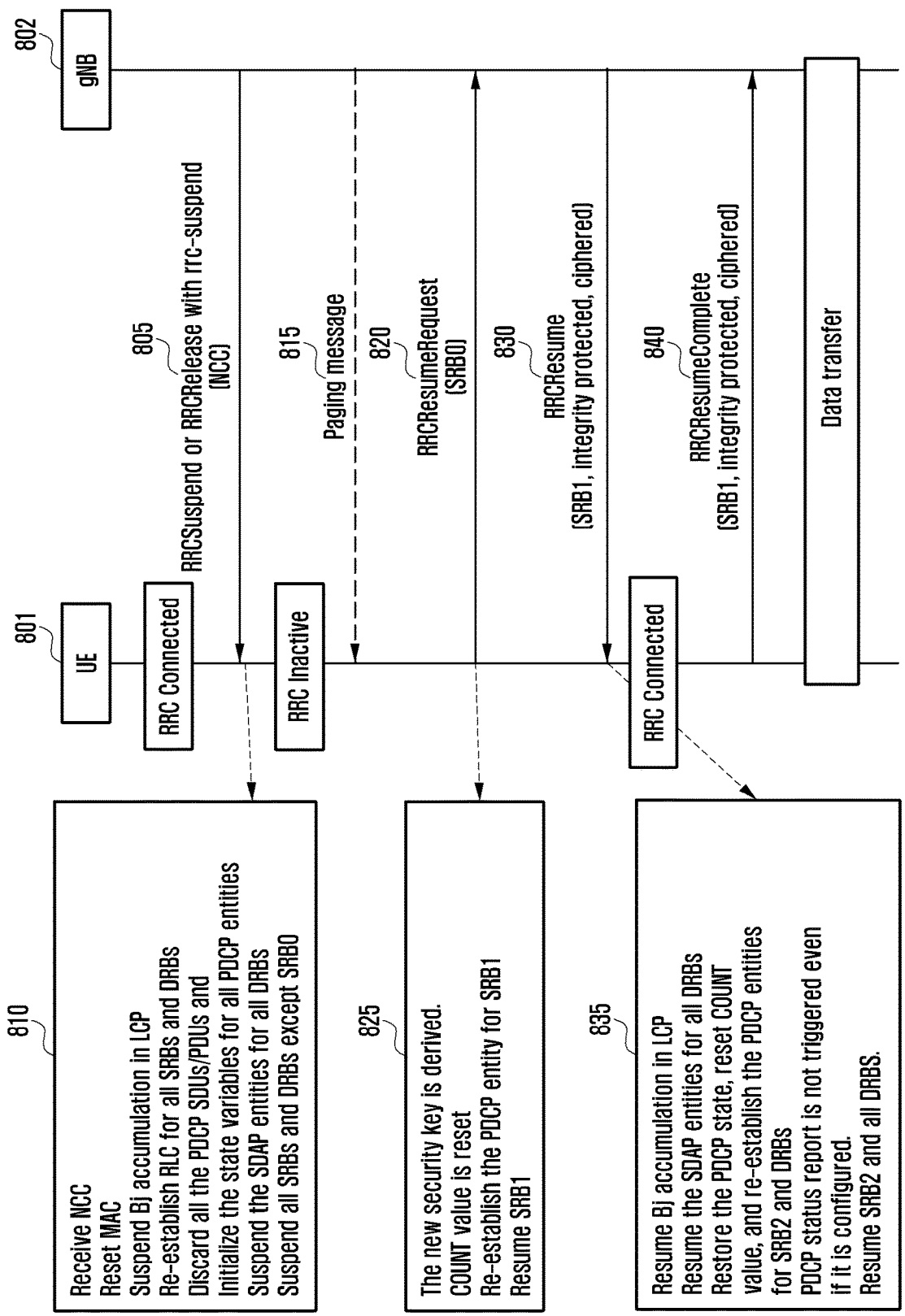
FIG. 8 is a diagram illustrating a first embodiment of respective protocol layer device operations and security setup procedures when a terminal in an RRC inactive mode receives a paging message or resumes a connection with a network due to an occurrence of data to be transmitted to an uplink according to an embodiment of the disclosure.

FIG. 8 is a diagram illustrating a first embodiment of respective protocol layer device operations and security setup procedures when a terminal in an RRC inactive mode receives a paging message or resumes a connection with a network due to the occurrence of data to be transmitted to an uplink according to an embodiment the disclosure.

Referring to FIG. 8, a base station (gNB) 802 may transition a terminal (UE) 801 in an RRC connected mode to an RRC inactive mode by sending an RRC message, at operation 805, thereto for a specific cause. Here, the specific cause may correspond to scheduling to efficiently use a transmission resource of a network, and may correspond to a case where downlink data to the UE or uplink data does not occur for some time or is not expected to occur. As described above, the RRC message may be an RRCRelease message with rrc-suspend that is an indication indicating transition to an RRC inactive mode, an RRCSuspend message indicating transition to the RRC inactive mode, or an RRCSuspend message with an indication indicating transition to the RRC inactive mode.

As described above, if the RRC message, at operation 805, is received, the UE can perform one or a plurality of the following operations (reception of the RRCSuspend or RRCRelease with rrc-suspend by the UE, at operation 810).

1. It is possible to store a connection resume identity (resumeIdentity) received from the RRC message, NCC determining a security key, and an RAN notification area information (ran-NotificationAreaInfo) for mobility support of the UE in the RRC inactive mode. As described above, the network can put an NCC value in the RRC message to be sent to the UE, and thus the security can be strengthened when the UE performs the connection resume procedure thereafter. That is, it is possible to early start integrity protection or ciphering by generating a new security key in advance. The RAN notification area information can include a cell list, an RAN notification area identity, or a timer value, and if the UE gets out of the area corresponding to the cell list or the RAN notification area identity, an RAN Notification area update procedure can be performed, it is possible to operate a timer in the RRC inactive state corresponding to the timer value, and it is possible to perform the RAN notification and update procedure whenever the timer expires (to store resumeIdentity, NCC, ran-NotificationAreaInfo, provided by the network).

2. A MAC layer device is reset, that is, is initialized. If the MAC layer device is not initialized, data transmitted in the RRC connected mode and existing in a buffer may be unnecessarily retransmitted later. That is, when the connection is resumed, inconsistency may occur between hybrid automatic-repeat-request (HARQ) process related information and HARQ process information, and thus the initialization can prevent the problem of the MAC layer device that may occur when the connection is resumed (Reset MAC).

3. The initialized MAC layer device may suspend a procedure of updating a token value (Bj) for a predetermined time unit for a logical channel prioritization (LCP) procedure. If the token value is continuously updated in the RRC inactive mode, the token value of each logical channel reaches the maximum value, and thus the LCP procedure may not normally operate when the connection is resumed. That is, the priority between the logical channels may not be applied properly (Suspend Bj accumulation in LCP procedure).

4. In an RLC layer device corresponding to each bearer of the UE, data (RLC SDUs or RLC PDUs) that has not yet been processed may remain in the buffer. Accordingly, retransmission of the data may be unnecessarily performed during the connection resume procedure. Further, RLC state variables of the UE may not be synchronized with RLC state variables of the gNB. That is, the transmitted RLC window may not be properly synchronized with the received RLC window. Accordingly, the UE reestablishes the RLC layer device with respect to all SRBs and DRBs (reestablishes RLC entities for all SRBs and DRBs).

5. In a PDCP layer device corresponding to each bearer of the UE, data (PDCP SDUs or PDCP PDUs) that has not yet been processed may remain in the buffer. Accordingly, retransmission of the data may be unnecessarily performed during the connection resume procedure. Further, PDCP state variables of the UE may not be synchronized with PDCP state variables of the gNB. That is, the transmitted PDCP window may not be properly synchronized with the received PDCP window. Accordingly, the UE discards all data of the PDCP layer device with respect to all SRBs and DRBs, and initializes the state variables (discard all the PDCP SDUs and PDUs for the PDCP entities of all SRBs and DRBs and initialize the state variables for the PDCP entities for all SRBs and DRBs). It is to be noted that the PDCP layer device reestablishment procedure does not include the data discard procedure and the state variable initialization procedure as described above with respect to the DRBs (variable initialization is possible with respect to the unacknowledged mode (UM) DRB), but mainly includes procedures for retransmission, update of a security key, and update of a ciphering algorithm and an integrity protection algorithm. Accordingly, it is possible to discard the data and initialize the state variables rather than to reestablish the PDCP layer device.

6. If the SDAP layer device is configured, the UE may suspend the SDAP layer device because it is not necessary to operate the SDAP layer device in the RRC inactive mode. That is, in the RRC inactive mode, the mapping procedure between the IP flow and the bearer is not necessary (Suspend the SDAP entities for all DRBs, if any).

7. Except for reception of the RRCSuspend message in response to the RRCResumeRequest message sent by the UE, a specific procedure can be performed. The specific procedure may be a procedure in which the UE stores the UE context, that is, RRC configuration information, security configuration information, PDCP state information (e.g., robust header compression (ROHC)), cell-radio network temporary identifier (C-RNTI), cell identity (cellIdentity), and physical cell identity (PCI).

8. The UE suspends the remaining SRBs and DRBs except for the SRB0. Later, if the UE receives a paging message, uplink data occurs in the UE, or the UE should perform the RAN notification area update procedure, the UE does not suspend the SRB0 so as to immediately start the connection resume procedure through the SRB0 (suspends all SRBs and DRBs, except SRB0).

9. The UE can operate a timer to periodically perform the RAN notification area update based on a timer value received from the RRC message (start a timer with timer value set to periodic-RNAU-timer).

10. The UE configures lower layers (e.g., PDCPs) to suspend the integrity protection and ciphering procedure (configures lower layers to suspend integrity protection and ciphering).

11. The UE is transitioned to the RRC inactive mode (enters RRC INACTIVE).

The UE having been transitioned to the RRC inactive mode as described above may perform an RRC connection resume procedure with a network for a specific cause. The specific cause may correspond to a case where the UE receives the paging message, at operation 815, or the uplink data occurs in the UE. For the above-described cause, the UE can perform one or a plurality of the following operations before, when, or after transmitting the RRC resume request message, at operation 820, in order to perform connection resume with the network (actions related to transmission of RRCResumeRequest message, at operation 825).

1. The UE configures the stored I-RNTI value as a connection resume identity (resumeIdentity). The connection resume identity is included in the RRC resume request message to be transmitted in order to start the connection resume procedure and to enable the gNB to discriminate the UE. The RRC message may include the connection resume identity and connection resume cause. The connection resume cause can indicate uplink transmission data occurrence, paging message reception (control signal reception), tracking area update, RAN notification area update (timer expiration), or RAN notification area update (deviation from the indicated area) (set resumeIdentity to the stored I-RNTI provided in suspend).

2. The UE receives the RRC message, at operation 805, and newly updates security keys based on the stored NCC value. That is, if the NCC value is not changed, the UE guides the new security keys using information on the previously used security key KgNB and a PCI and an absolute radio frequency channel number (ARFCN) read from the system information, whereas if the NCC value is changed, the UE guides the new security keys using information on another security key NG and a PCI and an ARFCN read from the system information (updates the KgNB key based on the current KgNB or the NH, using the stored NCC value).

3. Using the updated security keys, the UE can generate a message authentication code for integrity (MAC-I) so that it can perform the integrity protection when transmitting the RRC message (RRC resume request message), at operation 820, and can transmit the generated MAC-I to the gNB together with the RRC message.

4. The UE restores the stored RRC configuration information and security configuration information from the UE context (restores the RRC configuration and security context from the stored UE AS context).

5. If the UE has not thrown away the data of the PDCP layer device or has not initialized the state variables of the PDCP layer device when receiving the RRC message, at operation 805, the UE discards the data of the PDCP layer device (PDCP PDUs or SDUs) with respect to the PDCP layer device of SRB1, and initializes the state variables. As described above, unnecessary retransmission that may occur in the following PDCP reestablishment procedure can be prevented from occurring through discarding of the data, and the gNB and the state variables can be synchronized with each other through initialization of the state variables (discard all the PDCP SDUs and PDUs for the PDCP entities for SRB1 and initialize the state variables for the PDCP entities of SRB1). Specifically, the initialized state variables as described above may be TX_NEXT, RX_NEXT, RX_DELIV or RX_REORD values.

6. The UE may reestablish the PDCP layer device for SRB1 in order to update the ciphering algorithm and the integrity verification algorithm through the updated security keys. Further, the UE may restore the PDCP state. Further, because the security keys have been updated, the UE can initialize the COUNT value. It is to be noted that the PDCP layer device reestablishment procedure does not include the data discard procedure and the state variable initialization procedure as described above with respect to the DRBs (variable initialization is possible with respect to the UM DRB), but mainly includes procedures for retransmission, update of a security key, and update of a ciphering algorithm and an integrity protection algorithm (restore the PDCP state, reset COUNT value, and reestablish PDCP entities for SRB1).

7. The UE resumes SRB1. The reason why the UE resumes SRB1 when sending the RRC message is to send the RRC resume request message to SRB0 without performing ciphering and integrity protection, to normally receive the RRC resume message through SRB1, and to perform deciphering and integrity verification (resume SRB1).

8. The UE can resume the integrity protection and ciphering procedure based on the algorithms previously configured in lower layer devices (e.g., PDCP layer devices) of all bearers except SRB0 (configure lower layer to resume integrity protection and ciphering for all radio bearers except SRB0 using the previously configured algorithms and the updated keys).

As described above, the UE may transmit the RRC resume request message, at operation 820, and in response to this, the gNB may send the RRC resume message or the RRCRelease message, at operation 830, with the rrc-suspend indication to the UE. In the disclosure, in order to strengthen the security when the gNB sends the RRC message, at operation 830, the gNB may generate and update the security key based on the NCC transferred to the UE in the RRC message, at operation 805, and may perform the ciphering procedure and the integrity protection procedure with respect to the RRC message to be transmitted, at operation 830.

If the RRC resume message at operation 830 is received from the gNB, the UE can perform one or a plurality of the following operations (reception of the RRCResume by the UE, at operation 835).

1. The UE stops the timer for updating the RAN notification area operated in the RRC inactive mode (Stops the timer for RNA update).

2. If the RRC message is received, the UE starts again the update of a token value (Bj) for each logical channel for the LCP procedure at a predetermined time interval (Resume Bj accumulation in LCP procedure).

3. If the SDAP layer device is configured, the UE resumes the SDAP layer device with respect to all bearers (resumes the SDAP entities for all DRBs).

4. At operation 810 or 825, if the UE has not thrown away the data of the PDCP layer device or has not initialized the state variables of the PDCP layer device when receiving the RRC message at operation 805, the UE discards the data of the PDCP layer device (PDCP PDUs or SDUs) with respect to the PDCP layer devices of all bearers, and initializes the state variables. As described above, unnecessary retransmission that may occur in the following PDCP reestablishment procedure can be prevented from occurring through discarding of the data, and the gNB and the state variables can be synchronized with each other through initialization of the state variables (discard all the PDCP SDUs and PDUs for the PDCP entities for all SRBs and DRBs and initialize the state variables for the PDCP entities of all SRBs and DRBs). Specifically, the initialized state variables as described above may be TX_NEXT, RX_NEXT, RX_DELIV or RX_REORD values.

5. The UE may reestablish the PDCP layer device for SRB2 and all the DRBs in order to update the ciphering algorithm and the integrity verification algorithm through the updated security keys. Further, the UE may restore the PDCP state. Further, because the security keys have been updated, the UE can initialize the COUNT value. It is to be noted that the PDCP layer device reestablishment procedure does not include the data discard procedure and the state variable initialization procedure as described above with respect to the DRBs (variable initialization is possible with respect to the UM DRB), but mainly includes procedures for retransmission, update of a security key, and update of a ciphering algorithm and an integrity protection algorithm (restore the PDCP state, reset COUNT value, and reestablish PDCP entities for SRB2 and all DRBs). If it is required to send a PDCP status report to the gNB in a state where a statusReportRequired indication is configured in the PDCP layer device and the PDCP reestablishment procedure is performed, the UE may not perform this procedure. This is because there is currently no data in the PDCP layer device and thus there are no contents to be reported. If the statusReportRequired indication is configured, the PDCP layer device should originally configure and send the PDCP status report to the gNB during the reestablishment, and the indication can be configured in the PDCP configuration information (PDCP-config) of the message at operation 610, 640, or 675 in FIG. 6 or at operation 7070 in FIG. 7 when the RRC connection setup is performed.

6. Because the UE is ready to enter the RRC connection mode, it is possible to discard the stored UE context and UE resume identity (I-RNTI). The UE identity may be called resumeIdentity or I-RNTI (discard the stored UE AS context and I-RNTI).

7. The UE resumes SRB2 and all DRBs (resumes SRB2 and all DRBs).

8. The UE is transitioned to the RRC connection mode (enters RRC CONNECTED).

As described above, if the RRC message at operation 830 is received, the UE is transitioned to the RRC connection mode, and transmits an RRC resume complete message, at operation 840, indicating completion of the RRC connection setup to the gNB to resume data transmission and reception with the gNB.

Figure 9:
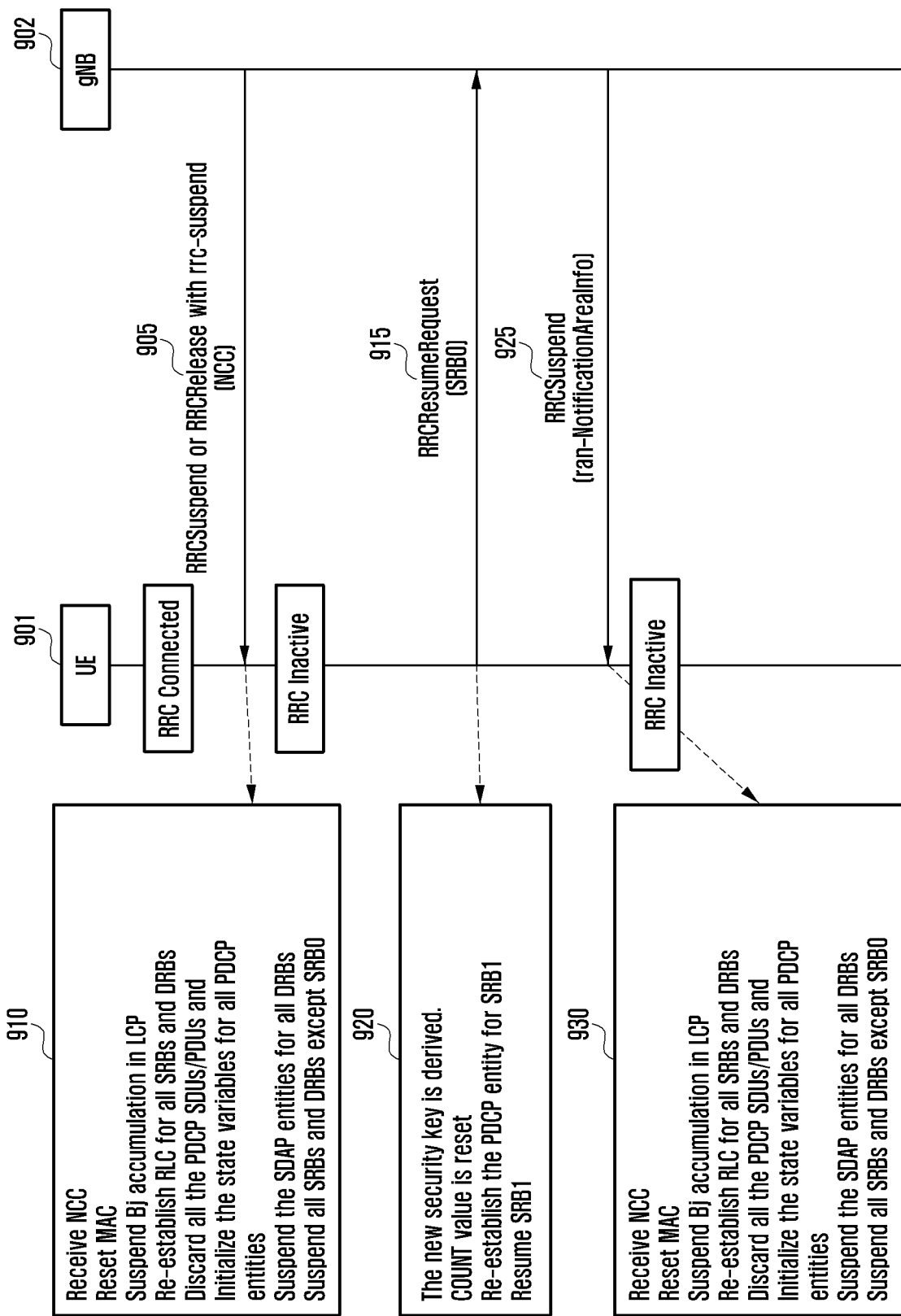
FIG. 9 is a diagram illustrating a second embodiment of respective protocol layer device operations and security setup procedures when a timer for periodic radio access network (RAN) notification area update by a terminal in an RRC inactive mode expires, a terminal in an RRC inactive mode deviates from an RAN notification area, or a terminal in an RRC inactive mode resumes a connection with a network for an RAN notification area update according to an embodiment of the disclosure.

FIG. 9 is a diagram illustrating a second embodiment of respective protocol layer device operations and security setup procedures when a timer for periodic RAN notification area update by a terminal in an RRC inactive mode expires, a terminal in an RRC inactive mode deviates from an RAN notification area, or a terminal in an RRC inactive mode resumes a connection with a network for the RAN notification area update according to an embodiment of the disclosure.

Referring to FIG. 9, a base station (gNB) 902 may transition a terminal (UE) 901 in an RRC connected mode to an RRC inactive mode by sending an RRC message, at operation 905, thereto for a specific cause. Here, the specific cause may correspond to scheduling to efficiently use a transmission resource of a network, and may correspond to a case where downlink data to the UE or uplink data does not occur for some time or is not expected to occur. As described above, the RRC message may be an RRCRelease message with rrc-suspend that is an indication indicating transition to an RRC inactive mode, an RRCSuspend message indicating transition to the RRC inactive mode, or an RRCSuspend message with an indication indicating transition to the RRC inactive mode.

As described above, if the RRC message at operation 905 is received, the UE can perform one or a plurality of the following operations (reception of the RRCSuspend or RRCRelease with rrc-suspend by the UE, at operation 910).

1. It is possible to store a connection resume identity (resumeIdentity) received from the RRC message, NCC determining a security key, and an RAN notification area information (ran-NotificationAreaInfo) for mobility support of the UE in the RRC inactive mode. As described above, the network can put an NCC value in the RRC message to be sent to the UE, and thus the security can be strengthened when the UE performs the connection resume procedure thereafter. That is, it is possible to early start integrity protection or ciphering by generating a new security key in advance. The RAN notification area information can include a cell list, an RAN notification area identity, or a timer value, and if the UE gets out of the area corresponding to the cell list or the RAN notification area identity, an RAN notification area update procedure can be performed, it is possible to operate a timer in the RRC inactive state corresponding to the timer value, and it is possible to perform the RAN notification and update procedure whenever the timer expires (to store resumeIdentity, NCC, ran-NotificationAreaInfo, provided by the network).

2. An MAC layer device is reset, that is, is initialized. If the MAC layer device is not initialized, data transmitted in the RRC connected mode and existing in a buffer may be unnecessarily retransmitted later. That is, when the connection is resumed, inconsistency may occur between HARQ process related information and HARQ process information, and thus the initialization can prevent the problem of the MAC layer device that may occur when the connection is resumed (Reset MAC).

3. The initialized MAC layer device may suspend a procedure of updating a token value (Bj) for a predetermined time unit for an LCP procedure. If the token value is continuously updated in the RRC inactive mode, the token value of each logical channel reaches the maximum value, and thus the LCP procedure may not normally operate when the connection is resumed. That is, the priority between the logical channels may not be applied properly (Suspend Bj accumulation in LCP procedure).

4. In an RLC layer device corresponding to each bearer of the UE, data (RLC SDUs or RLC PDUs) that has not yet been processed may remain in the buffer. Accordingly, retransmission of the data may be unnecessarily performed during the connection resume procedure. Further, RLC state variables of the UE may not be synchronized with RLC state variables of the gNB. That is, the transmitted RLC window may not be properly synchronized with the received RLC window. Accordingly, the UE reestablishes the RLC layer device with respect to all SRBs and DRBs (reestablishes RLC entities for all SRBs and DRBs).

5. In a PDCP layer device corresponding to each bearer of the UE, data (PDCP SDUs or PDCP PDUs) that has not yet been processed may remain in the buffer. Accordingly, retransmission of the data may be unnecessarily performed during the connection resume procedure. Further, PDCP state variables of the UE may not be synchronized with PDCP state variables of the gNB. That is, the transmitted PDCP window may not be properly synchronized with the received PDCP window. Accordingly, the UE discards all data of the PDCP layer device with respect to all SRBs and DRBs, and initializes the state variables (discard all the PDCP SDUs and PDUs for the PDCP entities of all SRBs and DRBs and initialize the state variables for the PDCP entities for all SRBs and DRBs). It is to be noted that the PDCP layer device reestablishment procedure does not include the data discard procedure and the state variable initialization procedure as described above with respect to the DRBs, but mainly includes procedures for retransmission, update of a security key, and update of a ciphering algorithm and an integrity protection algorithm. Accordingly, it is possible to discard the data and initialize the state variables rather than to reestablish the PDCP layer device.

6. If the SDAP layer device is configured, the UE may suspend the SDAP layer device because it is not necessary to operate the SDAP layer device in the RRC inactive mode. That is, in the RRC inactive mode, the mapping procedure between the IP flow and the bearer is not necessary (suspend the SDAP entities for all DRBs, if any).

7. Except for reception of the RRCSuspend message in response to the RRCResumeRequest message sent by the UE, a specific procedure can be performed. The specific procedure may be a procedure in which the UE stores the UE context, that is, RRC configuration information, security configuration information, PDCP state information (e.g., ROHC), C-RNTI, cell identity (cellIdentity), and PCI.

8. The UE suspends the remaining SRBs and DRBs except for the SRB0. Later, if the UE receives a paging message, uplink data occurs in the UE, or the UE should perform the RAN notification area update procedure, the UE does not suspend the SRB0 so as to immediately start the connection resume procedure through the SRB0 (suspends all SRBs and DRBs, except SRB0).

9. The UE can operate a timer to periodically perform the RAN notification area update based on a timer value received from the RRC message (start a timer with timer value set to periodic-RNAU-timer).

10. The UE configures lower layers (e.g., PDCPs) to suspend the integrity protection and ciphering procedure (configures lower layers to suspend integrity protection and ciphering).

11. The UE is transitioned to the RRC inactive mode (enters RRC INACTIVE).

The UE having been transitioned to the RRC inactive mode as described above may perform an RRC connection resume procedure with a network for a specific cause. The specific cause may correspond to a case where a timer for periodic RAN notification area update expires or the UE in the RRC inactive mode deviates from the RAN notification area. For the above-described cause, the UE can perform one or a plurality of the following operations before, when, or after transmitting the RRC resume request message, at operation 915, in order to perform connection resume with the network (actions related to transmission of RRCResumeRequest message, at operation 920).

1. The UE configures the stored I-RNTI value as a connection resume identity (resumeIdentity). The connection resume identity is included in the RRC resume request message to be transmitted in order to start the connection resume procedure and to enable the gNB to discriminate the UE. The RRC message may include the connection resume identity and connection resume cause. The connection resume cause can indicate uplink transmission data occurrence, paging message reception (control signal reception), tracking area update, RAN notification area update (timer expiration), or RAN notification area update (deviation from the indicated area) (set resumeIdentity to the stored I-RNTI provided in suspend).

2. The UE receives the RRC message at operation 905, and newly updates security keys based on the stored NCC value. That is, if the NCC value is not changed, the UE guides the new security keys using information on the previously used security key KgNB and a PCI and an ARFCN read from the system information, whereas if the NCC value is changed, the UE guides the new security keys using information on another security key NG and a PCI and an ARFCN read from the system information (updates the KgNB key based on the current KgNB or the NH, using the stored NCC value).

3. Using the updated security keys, the UE can generate an MAC-I so that it can perform the integrity protection when transmitting the RRC message (RRC resume request message) at operation 920, and can transmit the generated MAC-I to the gNB together with the RRC message.

4. The UE restores the stored RRC configuration information and security configuration information from the UE context (restores the RRC configuration and security context from the stored UE AS context).

5. If the UE has not thrown away the data of the PDCP layer device or has not initialized the state variables of the PDCP layer device when receiving the RRC message at operation 905, the UE discards the data of the PDCP layer device (PDCP PDUs or SDUs) with respect to the PDCP layer device of SRB1, and initializes the state variables. As described above, unnecessary retransmission that may occur in the following PDCP reestablishment procedure can be prevented from occurring through discarding of the data, and the gNB and the state variables can be synchronized with each other through initialization of the state variables (discard all the PDCP SDUs and PDUs for the PDCP entities for SRB1 and initialize the state variables for the PDCP entities of SRB1). Specifically, the initialized state variables as described above may be TX_NEXT, RX_NEXT, RX_DELIV or RX_REORD values.

6. The UE may reestablish the PDCP layer device for SRB1 in order to update the ciphering algorithm and the integrity verification algorithm through the updated security keys. Further, the UE may restore the PDCP state. Further, because the security keys have been updated, the UE can initialize the COUNT value. It is to be noted that the PDCP layer device reestablishment procedure does not include the data discard procedure and the state variable initialization procedure as described above with respect to the DRBs (variable initialization is possible with respect to the UM DRB), but mainly includes procedures for retransmission, update of a security key, and update of a ciphering algorithm and an integrity protection algorithm (restore the PDCP state, reset COUNT value, and reestablish PDCP entities for SRB1).

7. The UE resumes SRB1. The reason why the UE resumes SRB1 when sending the RRC message is to send the RRC resume request message to SRB0 without performing ciphering and integrity protection, to normally receive the RRC resume message through SRB1, and to perform deciphering and integrity verification (resume SRB1).

8. The UE can resume the integrity protection and ciphering procedure based on the algorithms previously configured in lower layer devices (e.g., PDCP layer devices) of all bearers except SRB0 (configure lower layer to resume integrity protection and ciphering for all radio bearers except SRB0 using the previously configured algorithms and the updated keys).

As described above, the UE may transmit the RRC resume request message at operation 915, and in response to this, the gNB may send the RRC suspend message or the RRCRelease message, at operation 925, with the rrc-suspend indication to the UE. Specifically, if the connection resume cause of the UE indicates tracking area update, RAN notification area update (timer expiration), or RAN notification area update (deviation from the indicated area) in the RRC resume request message, the gNB may send the RRC suspend message or the RRCRelease message, at operation 925, with the rrc-suspend indication to the UE. The RRC message of operation 925 may include RAN notification area configuration information (ranNotificationAreaInfo) for configuring a new RAN notification area, and the RAN notification area configuration information may include a cell list, an RAN notification area identity, or a timer value. If the UE deviates from the area corresponding to the cell list or the RAN notification area identity, the UE may perform an RAN notification area update procedure, operate a timer corresponding to the timer value in an RRC inactive state, and perform RAN notification area update procedure whenever the timer expires.

In the disclosure, in order to strengthen the security when the gNB sends the RRC message at operation 925, the gNB may generate and update the security key based on the NCC transferred to the UE in the RRC message at operation 905, and may perform the ciphering procedure and the integrity protection procedure with respect to the RRC message to be transmitted at operation 925.

If the RRC suspend message or the RRCRelease message with the rrc-suspend indication is received from the gNB at operation 925, the UE can perform one or a plurality of the following procedures (reception of the RRCResume by the UE, at operation 930).

1. It is possible to store a connection resume identity (resumeIdentity) received from the RRC message, NCC determining a security key, and an RAN notification area information (ran-NotificationAreaInfo) for mobility support of the UE in the RRC inactive mode. As described above, the network can put an NCC value in the RRC message to be sent to the UE, and thus the security can be strengthened when the UE performs the connection resume procedure thereafter. That is, it is possible to early start integrity protection or ciphering by generating a new security key in advance. The RAN notification area information can include a cell list, an RAN notification area identity, or a timer value, and if the UE gets out of the area corresponding to the cell list or the RAN notification area identity, an RAN notification area update procedure can be performed, it is possible to operate a timer in the RRC inactive state corresponding to the timer value, and it is possible to perform the RAN notification are update procedure whenever the timer expires (to store resumeIdentity, NCC, ran-NotificationAreaInfo, provided by the network).

2. An MAC layer device is reset, that is, is initialized. If the MAC layer device is not initialized, data transmitted in the RRC connected mode and existing in a buffer may be unnecessarily retransmitted later. That is, when the connection is resumed, inconsistency may occur between HARQ process related information and HARQ process information, and thus the initialization can prevent the problem of the MAC layer device that may occur when the connection is resumed (Reset MAC).

3. The initialized MAC layer device may suspend a procedure of updating a token value (Bj) for a predetermined time unit for an LCP procedure. If the token value is continuously updated in the RRC inactive mode, the token value of each logical channel reaches the maximum value, and thus the LCP procedure may not normally operate when the connection is resumed. That is, the priority between the logical channels may not be applied properly (Suspend Bj accumulation in LCP procedure).

4. In an RLC layer device corresponding to each bearer of the UE, data (RLC SDUs or RLC PDUs) that has not yet been processed may remain in the buffer. Accordingly, retransmission of the data may be unnecessarily performed during the connection resume procedure. Further, RLC state variables of the UE may not be synchronized with RLC state variables of the gNB. That is, the transmitted RLC window may not be properly synchronized with the received RLC window. Accordingly, the UE reestablishes the RLC layer device with respect to all SRBs and DRBs (reestablishes RLC entities for all SRBs and DRBs).

5. In a PDCP layer device corresponding to each bearer of the UE, data (PDCP SDUs or PDCP PDUs) that has not yet been processed may remain in the buffer. Accordingly, retransmission of the data may be unnecessarily performed during the connection resume procedure. Further, PDCP state variables of the UE may not be synchronized with PDCP state variables of the gNB. That is, the transmitted PDCP window may not be properly synchronized with the received PDCP window. Accordingly, the UE discards all data of the PDCP layer device with respect to all SRBs and DRBs, and initializes the state variables (discard all the PDCP SDUs and PDUs for the PDCP entities of all SRBs and DRBs and initialize the state variables for the PDCP entities for all SRBs and DRBs). It is to be noted that the PDCP layer device reestablishment procedure does not include the data discard procedure and the state variable initialization procedure as described above with respect to the DRBs, but mainly includes procedures for retransmission, update of a security key, and update of a ciphering algorithm and an integrity protection algorithm. Accordingly, it is possible to discard the data and initialize the state variables rather than to reestablish the PDCP layer device.

6. If the SDAP layer device is configured, the UE may suspend the SDAP layer device because it is not necessary to operate the SDAP layer device in the RRC inactive mode. That is, in the RRC inactive mode, the mapping procedure between the IP flow and the bearer is not necessary (suspend the SDAP entities for all DRBs, if any).

7. Except for reception of the RRCSuspend message in response to the RRCResumeRequest message sent by the UE, a specific procedure can be performed. The specific procedure may be a procedure in which the UE stores the UE context, that is, RRC configuration information, security configuration information, PDCP state information (e.g., ROHC), C-RNTI, cell identity (cellIdentity), and PCI. That is, if the timer for the periodic RAN notification area update expires, or if the UE in the RRC inactive mode deviates from the RAN notification area and thus a connection resume procedure for the RAN notification area update is performed, the specific procedure is not performed.

8. The UE suspends the remaining SRBs and DRBs except for the SRB0. Later, if the UE receives a paging message, uplink data occurs in the UE, or the UE should perform the RAN notification area update procedure, the UE does not suspend the SRB0 so as to immediately start the connection resume procedure through the SRB0 (suspends all SRBs and DRBs, except SRB0).

9. The UE can operate a timer to periodically perform the RAN notification area update based on a timer value received from the RRC message (start a timer with timer value set to periodic-RNAU-timer).

10. The UE configures lower layers (e.g., PDCPs) to suspend the integrity protection and ciphering procedure (configures lower layers to suspend integrity protection and ciphering).

11. The UE is transitioned to the RRC inactive mode (enters RRC INACTIVE).

If the RRC suspend message or the RRCRelease message of operation 925 with the rrc-suspend indication is received, the UE maintains the RRC active mode again.

Next, in the disclosure, a method is proposed, in which the UE does not trigger unnecessary PDCP status report.

In the next-generation mobile communication system, the PDCP status report is triggered in case where an upper layer (e.g., NAS layer) of the UE requests a PDCP reestablishment procedure or a PDCP data recovery procedure from the PDCP layer device, and in this case, the UE should configure and transmit the PDCP status report to the gNB.

In the disclosure, the above-described condition is further sub-divided, and the UE does not trigger or transmit the unnecessary PDCP status report to reduce a burden of UE processing and to reduce unnecessary overhead.

In the disclosure, it is proposed that if one of the following conditions is satisfied, the PDCP status report is not triggered, configured, or transmitted although the upper layer requests the PDCP reestablishment procedure.

1. A case where a statusReportRequired value is set to TRUE in the PDCP layer device for the UE bearer (although it is indicated to perform the PDCP status report during PDCP reestablishment or PDCP data recovery), but reuse of UE AS context is indicated in the RRC message received by the UE.

2. A case where a statusReportRequired value is set to TRUE in the PDCP layer device for the UE bearer (although it is indicated to perform the PDCP status report during PDCP reestablishment or PDCP data recovery), but the RRC message received by the UE is an RRC resume message and the PDCP reestablishment is requested through reception of the RRC message.

3. A case where a statusReportRequired value is set to TRUE in the PDCP layer device for the UE bearer (although it is indicated to perform the PDCP status report during PDCP reestablishment or PDCP data recovery), but the PDCP reestablishment is requested during the RRC resume procedure of the UE.

4. A case where a statusReportRequired value is set to FALSE in the PDCP layer device for the UE bearer (if it is indicated not to perform the PDCP status report during PDCP reestablishment or PDCP data recovery).

5. A case where a statusReportRequired value is set to TRUE in the PDCP layer device for the UE bearer (although it is indicated to perform the PDCP status report during PDCP reestablishment or PDCP data recovery), but data (PDCP SDUs and PDCP PDUs) stored in the PDCP layer device of the UE does not exist in a buffer and the RX_NEXT variable value and RX_DELIV variable value are equal to each other.

Further, in the disclosure, it is proposed that if one of the following conditions is satisfied and the PDCP reestablishment procedure is requested from an upper layer, the PDCP status report is triggered, configured, and transmitted.

1. A case where a statusReportRequired value is set to TRUE in the PDCP layer device for the UE bearer (it is indicated to perform the PDCP status report during PDCP reestablishment or PDCP data recovery), and an indication for indicating the PDCP reestablishment (reestablishPDCP) is included in the RRC message received by the UE.

2. A case where a statusReportRequired value is set to TRUE in the PDCP layer device for the UE bearer (it is indicated to perform the PDCP status report during PDCP reestablishment or PDCP data recovery), and RRC configuration information and bearer configuration information (ReconfigWithSync) are included in RRC message received by the UE.

3. A case where a statusReportRequired value is set to TRUE in the PDCP layer device for the UE bearer (it is indicated to perform the PDCP status report during PDCP reestablishment or PDCP data recovery), and the RRC message received by the UE is a message indicating a handover procedure and the PDCP reestablishment is requested for the handover.

4. A case where a statusReportRequired value is set to FALSE in the PDCP layer device for the UE bearer (if it is indicated not to perform the PDCP status report during PDCP reestablishment or PDCP data recovery), and PDCP data (PDCP SDUs and PDCP PDUs) stored in the PDCP layer device exists in a buffer and the RX_NEXT variable value and RX_DELIV variable value are equal to each other.

In the disclosure, the PDCP status report triggering is further sub-divided based on the conditions proposed in the disclosure, and the UE does not trigger or transmit the unnecessary PDCP status report to reduce a burden of UE processing and to reduce unnecessary overhead.

Next, in the disclosure, new PDCP reestablishment methods of a transmission PDCP layer device (transmitting PDCP entity) are proposed to efficiently perform different PDCP reestablishment procedures in accordance with an RRC message.

A reestablishment procedure of a first PDCP layer device (PDCP reestablishment) proposed in the disclosure is as follows, and can be applied to a PDCP layer device connected to an RLC layer device in an RLC acknowledged mode (RLC AM).

Apply a ciphering algorithm and a security key provided by upper layers during a PDCP entity reestablishment procedure.
    Apply an integrity protection algorithm and a security key provided by upper layers during a PDCP entity reestablishment procedure.
    For acknowledged mode (AM) DRBs, from the first PDCP SDU for which the successful delivery of the corresponding PDCP data PDU has not been confirmed by lower layers, perform retransmission or transmission of all PDCP SDUs already associated with PDCP SNs in ascending order of COUNT values associated to the PDCP SDU prior to PDCP entity reestablishment.
    Perform header compression of the PDCP SDU.
    Perform integrity protection and ciphering of the PDCP SDU using the COUNT value associated with the PDCP SDU.
    Submit the resulting PDCP data PDU to lower layer.

A reestablishment procedure of a second PDCP layer device (PDCP reestablishment) proposed in the disclosure is as follows, and can be applied to a PDCP layer device connected to an RLC layer device in an RLC acknowledged mode (RLC AM). The reestablishment procedure of the second PDCP layer device proposed in the disclosure may be defined as a PDCP initialization procedure (PDCP reset).

Set TX_NEXT state variable to an initial value.
    Discard all stored PDCP SDUs and PDCP PDUs.
    Apply a ciphering algorithm and a security key provided by upper layers.
    Apply an integrity protection algorithm and a security key provided by upper layers.
    Set RX_NEXT and RX_DELIV state variables to initial values.

The first PDCP reestablishment procedure proposed in the disclosure can be performed if one of the following conditions is satisfied.

1. A case where an RRC message received by UE includes RRC configuration information and bearer configuration information (ReconfigWithSync), and a PDCP reestablishment procedure is requested.

2. A case where an RRC message received by UE is an RRC reconfiguration message or indicates handover, and a PDCP reestablishment procedure is requested.

3. A case where an indication indicating PDCP reestablishment (reestablishPDCP) is included in an RRC message received by UE, and a PDCP reestablishment procedure is requested.

The second PDCP reestablishment procedure (PDCP initialization procedure) proposed in the disclosure can be performed if one of the following conditions is satisfied.

1. A case where reuse of a UE AS context is indicated in an RRC message received by UE, and a PDCP reestablishment procedure is requested.

2. A case where an RRC message received by UE is an RRC resume message, and a PDCP reestablishment procedure is requested.

3. A case where a PDCP reestablishment procedure is requested in a connection resume configuration procedure of UE.

Next, in the disclosure, an efficient paging method is proposed in case where a gNB sends a paging message to UE in an RRC inactive mode or UE in an RRC idle mode.

In the paging method proposed in the disclosure, the gNB can define two different paging messages. The first paging message may be called a CN paging message, and is a message that can be used to send paging to UE in an RRC idle mode. The second paging message may be called an RAN paging message, and can be used to send paging to UE in an RRC inactive mode. The UE can discriminate the two paging messages based on an identity included in the paging message. For example, if an identity, such as S-TMSI or IMSI, is included in the paging message, the UE may consider the paging message as the CN paging message. In contrast, if resumeIdentity or I-RNTI is included in the paging message, the paging message may be considered as the RAN paging message. Further, the CN paging message and the RAN paging message may include an indication indicating that the system information is changed and should be newly received.

In the paging method proposed in the disclosure, the different CN paging message and RAN paging message can be defined and used as one common paging message. That is, only one paging message may be defined, and through an identity included in the paging message, it can be discriminated whether the paging message is a message transferred to UE in an RRC inactive mode (in case where the included identity is resumeIdentity or I-RNTI) or a message transferred to UE in an RRC idle mode (in case where the included identity is S-TMSI or IMSI).

In the first and second embodiments of the disclosure, a procedure of resetting the COUNT value can be performed when the UE receives the RRC message (e.g., RRCRelease message) from the gNB and thus the UE is transitioned to the RRC inactive mode. That is, the stored data as described above may be thrown away, and the above-described procedure may be performed together with procedures of initializing window state variables and timer. Through this, it is possible to prepare in advance the transmission window variables and the timer that should be driven when the data is transmitted and the COUNT values necessary when data to be transmitted is ciphered.

As described above, if the UE receives the RRC message (e.g., RRCRelease message) from the gNB and the RRC message includes an indication indicating that the UE is to be transitioned to the RRC inactive mode (e.g., rrc-suspend), reception of the RRC message may mean transition of the UE to the RRC inactive mode.

Figure 10:
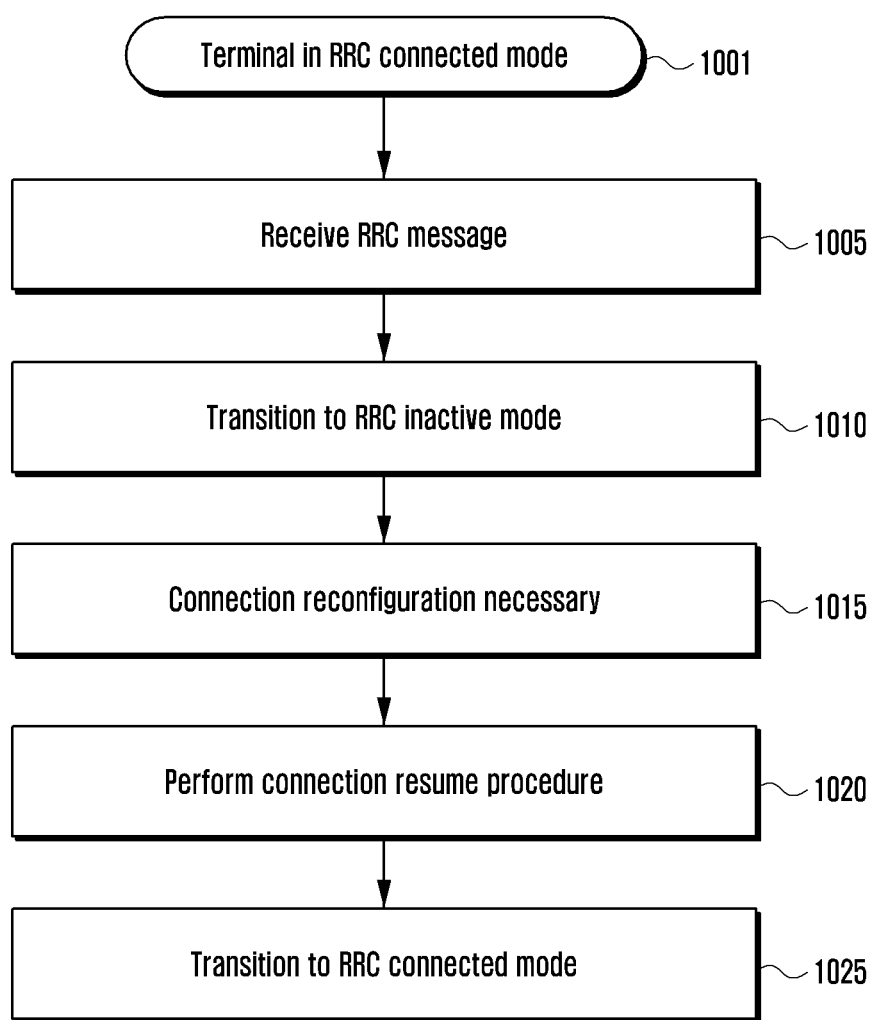
FIG. 10 is a diagram explaining an operation of a terminal performing procedures according to an embodiment of the disclosure.

FIG. 10 is a diagram illustrating an operation of a terminal performing the above-described procedures according to an embodiment of the disclosure.

Referring to FIG. 10, the terminal may transmit and receive data in an RRC connected mode, at operation 1001, and may be transitioned to an RRC inactive mode through an RRC message received from a base station, at operations 1005 and 1010. In order to strengthen the security, the base station may include an NCC value in the RRC message to be transmitted, and the terminal may store the NCC value and may use the NCC value in newly generating and updating a security key when resuming the connection. The terminal performs a connection resume procedure, at operations 1015 and 1020, in case where a paging message is received, it is necessary to update an RAN notification area, uplink data is generated, or it is necessary to perform a tracking area update. As performing the connection resume procedure, the terminal performs the above-described procedure proposed in the disclosure, and is transitioned to the RRC connected mode, at operation 1025.

Figure 11:
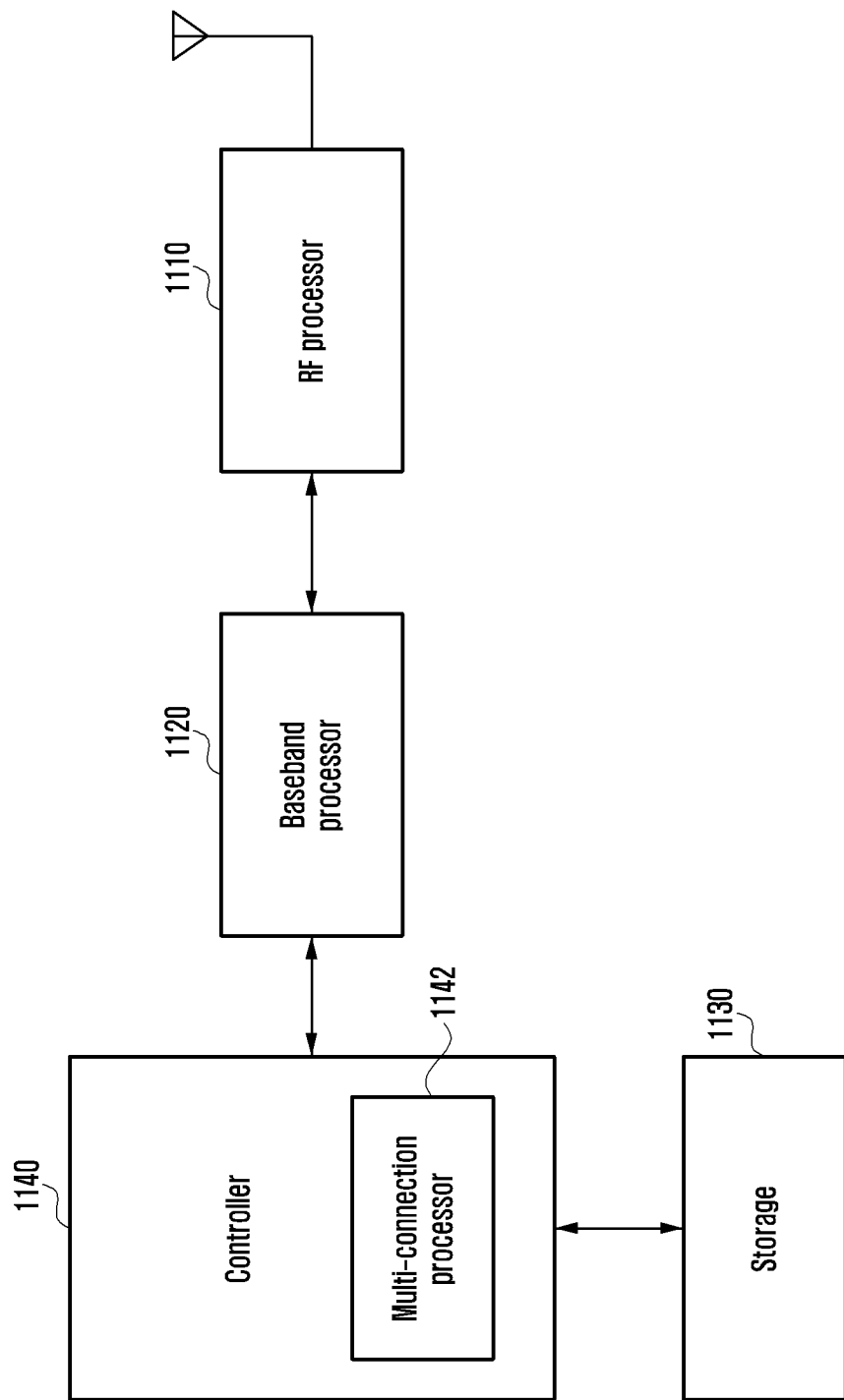
FIG. 11 is a diagram illustrating a structure of a terminal according to an embodiment of the disclosure.

FIG. 11 is a diagram illustrating the structure of a terminal according to an embodiment of the disclosure.

Referring to FIG. 11, the terminal includes a radio frequency (RF) processor 1110, a baseband processor 1120, a storage 1130, and a controller 1140.

The RF processor 1110 performs a function for transmitting and receiving a signal on a radio channel, such as signal band conversion and amplification. That is, the RF processor 1110 performs up-conversion of a baseband signal provided from the baseband processor 1120 into an RF-band signal to transmit the converted signal to an antenna, and performs down-conversion of the RF-band signal received through the antenna into a baseband signal. For example, the RF processor 1110 may include a transmission filter, a reception filter, an amplifier, a mixer, an oscillator, a digital-to-analog converter (DAC), and an analog-to-digital converter (ADC). Although only one antenna is illustrated in the drawing, the terminal may be provided with a plurality of antennas. Further, the RF processor 1110 may include a plurality of RF chains. Further, the RF processor 1110 may perform beamforming. For the beamforming, the RF processor 1110 may adjust phases and sizes of signals transmitted or received through the plurality of antennas or antenna elements. Further, the RF processor may perform MIMO, and may receive several layers during performing of a MIMO operation. The RF processor 1110 may perform reception beam sweeping through proper configuration of the plurality of antennas or antenna elements under the control of the controller, or may control the direction and the beam width of the reception beam so that the reception beam is synchronized with the transmission beam.

The baseband processor 1120 performs conversion between a baseband signal and a bit string in accordance with the physical layer standard of the system. For example, during data transmission, the baseband processor 1120 generates complex symbols by encoding and modulating a transmitted bit string. Further, during data reception, the baseband processor 1120 restores a received bit string by demodulating and decoding the baseband signal provided from the RF processor 1110. For example, in the case of following an OFDM method, during data transmission, the baseband processor 1120 generates complex symbols by encoding and modulating a transmitted bit string, performs mapping of the complex symbols on subcarriers, and then configures OFDM symbols through the inverse fast Fourier transform (IFFT) operation and cyclic prefix (CP) insertion. Further, during data reception, the baseband processor 1120 divides the baseband signal provided from the RF processor 1110 in the unit of OFDM symbols, restores the signals mapped on the subcarriers through the FFT operation, and then restores the received bit string through demodulation and decoding.

The baseband processor 1120 and the RF processor 1110 transmit and receive the signals as described above. Accordingly, the baseband processor 1120 and the RF processor 1110 may be called a transmitter, a receiver, a transceiver, or a communication unit. Further, in order to support different radio connection technologies, at least one of the baseband processor 1120 and the RF processor 1110 may include a plurality of communication modules. Further, in order to process signals of different frequency bands, at least one of the baseband processor 1120 and the RF processor 1110 may include different communication modules. For example, the different radio connection technologies may include an LTE network and an NR network. Further, the different frequency bands may include super high frequency (SHF) (e.g., 2.2 GHz or 2 GHz) band and millimeter wave (mm Wave) (e.g., 60 GHz) band.

The storage 1130 stores therein a basic program for an operation of the terminal, application programs, and data of configuration information. The storage 1130 provides stored data in accordance with a request from the controller 1140.

The controller 1140 controls the whole operation of the terminal. For example, the controller 1140 transmits and receives signals through the baseband processor 1120 and the RF processor 1110. Further, the controller 1140 records or reads data in or from the storage 1130. For this, the controller 1140 may include at least one processor or a multi-connection processor 1142. For example, the controller 1140 may include a communication processor performing a control for communication and an application processor (AP) controlling an upper layer, such as an application program.

Figure 12:
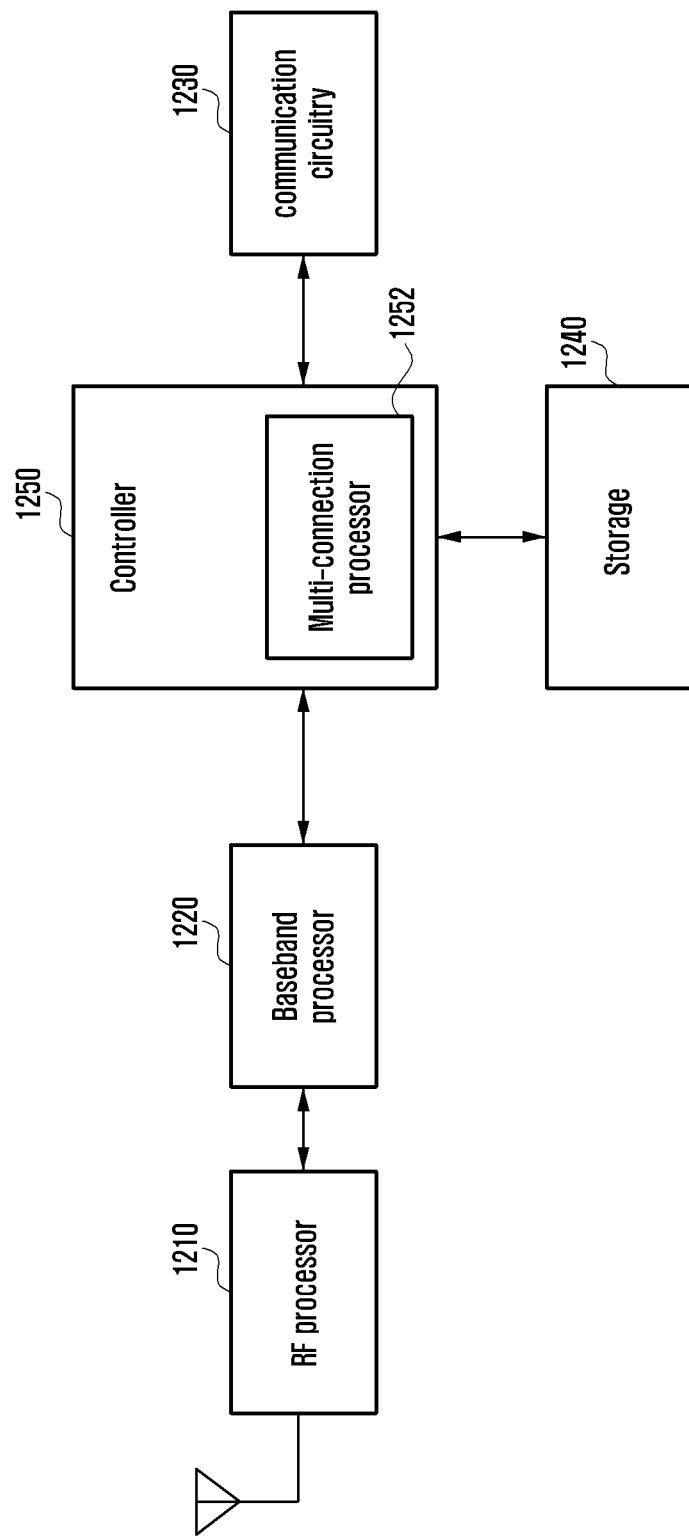
FIG. 12 is a diagram illustrating a structure of a base station according to an embodiment of the disclosure.

FIG. 12 is a diagram illustrating a structure of a base station according to an embodiment of the disclosure.

Referring to FIG. 12, a base station includes an RF processor 1210, a baseband processor 1220, a communication circuitry 1230, a storage 1240, and a controller 1250.

The RF processor 1210 performs a function for transmitting and receiving a signal on a radio channel, such as signal band conversion and amplification. That is, the RF processor 1210 performs up-conversion of a baseband signal provided from the baseband processor 1220 into an RF-band signal to transmit the converted signal to an antenna, and performs down-conversion of the RF-band signal received through the antenna into a baseband signal. For example, the RF processor 1210 may include a transmission filter, a reception filter, an amplifier, a mixer, an oscillator, a DAC, and an ADC. Although only one antenna is illustrated in the drawing, the first connection node may be provided with a plurality of antennas. Further, the RF processor 1210 may include a plurality of RF chains. Further, the RF processor 1210 may perform beamforming. For the beamforming, the RF processor 1210 may adjust phases and sizes of signals transmitted or received through the plurality of antennas or antenna elements. Further, the RF processor may perform down MIMO operation through transmission of one or more layers.

The baseband processor 1220 performs conversion between a baseband signal and a bit string in accordance with the physical layer standard of the first radio connection technology. For example, during data transmission, the baseband processor 1220 generates complex symbols by encoding and modulating a transmitted bit string. Further, during data reception, the baseband processor 1220 restores a received bit string by demodulating and decoding the baseband signal provided from the RF processor 1210. For example, in the case of following an OFDM method, during data transmission, the baseband processor 1220 generates complex symbols by encoding and modulating a transmitted bit string, performs mapping of the complex symbols on subcarriers, and then configures OFDM symbols through the IFFT operation and CP insertion. Further, during data reception, the baseband processor 1220 divides the baseband signal provided from the RF processor 1210 in the unit of OFDM symbols, restores the signals mapped on the subcarriers through the FFT operation, and then restores the received bit string through demodulation and decoding. The baseband processor 1220 and the RF processor 1210 transmit and receive the signals as described above. Accordingly, the baseband processor 1220 and the RF processor 1210 may be called a transmitter, a receiver, a transceiver, a communication circuitry, or a wireless communication circuitry.

The communication circuitry 1230 provides an interface for performing communication with other nodes in the network.

The storage 1240 stores therein a basic program for an operation of the main base station, application programs, and data of configuration information. In particular, the storage 1240 may store information on a bearer allocated to the connected terminal and the measurement result reported from the connected terminal. Further, the storage 1240 may store information that becomes a basis of determination whether to provide or suspend a multi-connection to the terminal. Further, the storage 1240 provides stored data in accordance with a request from the controller 1250.

The controller 1250 controls the whole operation of the main base station. For example, the controller 1250 transmits and receives signals through the baseband processor 1220 and the RF processor 1210 or through the communication circuitry 1230. Further, the controller 1250 records or reads data in or from the storage 1240. For this, the controller 1250 may include at least one processor or a multi-connection processor 1252.

As described above, embodiments disclosed in the specification and drawings are merely used to present specific examples to easily explain the contents of the disclosure and to help understanding, but are not intended to limit the scope of the disclosure. Accordingly, the scope of the disclosure should be analyzed to include all changes or modifications derived based on the technical concept of the disclosure in addition to the embodiments disclosed herein.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   receiving, from a base station, a radio resource control (RRC) release message including information configuring an RRC inactive state;
   resetting a medium access control (MAC) entity based on the information;
   suspending all signaling radio bearers (SRBs) and all data radio bearers (DRBs) except for an SRB0 based on the information;
   performing operations for the all DRBs based on the information, wherein the operations comprise:
   setting a state variable of a packet data convergence protocol (PDCP) entity to an initial value, and
   discarding all stored PDCP protocol data units (PDUs) of the PDCP entity; and
   entering the RRC inactive state based on the information.

2. The method of claim 1, further comprising:
   identifying that a resumption of an RRC connection is triggered while the terminal is in the RRC inactive state; and
   transmitting, to the base station, an RRC resume request message.

3. The method of claim 2, wherein the resumption of the RRC connection is triggered based on a received paging message.

4. The method of claim 1, wherein the state variable includes a first state variable indicating a count value of a next PDCP service data unit (SDU) of the PDCP entity to be transmitted.

5. The method of claim 1, wherein the state variable includes a second state variable indicating a count value of a next PDCP service data unit (SDU) of the PDCP entity expected to be received and a third state variable indicating a count value of a first PDCP SDU of the PDCP entity not delivered to an upper layer and waited for.

6. A method performed by a base station in a wireless communication system, the method comprising:
   generating a radio resource control (RRC) release message including information configuring an RRC inactive state, wherein the information is to be used by a terminal for:
   resetting a medium access control (MAC) entity,
   suspending all signaling radio bearers (SRBs) and all data radio bearers (DRBs) except for an SRB0,
   performing, for the all DRBs, operations comprising:
   setting a state variable of a packet data convergence protocol (PDCP) entity to an initial value, and
   discarding all stored PDCP protocol data units (PDUs) of the PDCP entity, and
   entering the RRC inactive state; and
   transmitting, to the terminal, the RRC release message.

7. The method of claim 6, further comprising:
   receiving, from the terminal, an RRC resume request message based on a resumption of an RRC connection being triggered while the terminal is in the RRC inactive state.

8. The method of claim 7, wherein the resumption of the RRC connection is triggered based on a paging message transmitted to the terminal.

9. The method of claim 6, wherein the state variable includes a first state variable indicating a count value of a next PDCP service data unit (SDU) of the PDCP entity to be transmitted.

10. The method of claim 6, wherein the state variable includes a second state variable indicating a count value of a next PDCP service data unit (SDU) of the PDCP entity expected to be received and a third state variable indicating a count value of a first PDCP SDU of the PDCP entity not delivered to an upper layer and waited for.

11. A terminal in a wireless communication system, the terminal comprising:
    a transceiver; and
    a controller coupled with the transceiver and configured to:
    receive, from a base station, a radio resource control (RRC) release message including information configuring an RRC inactive state, reset a medium access control (MAC) entity based on the information, suspend all signaling radio bearers (SRBs) and all data radio bearers (DRBs) except for an SRB0 based on the information, perform operations for the all DRBs based on the information, wherein the operations comprise:

setting a state variable of a packet data convergence protocol (PDCP) entity to an initial value, and discarding all stored PDCP protocol data units (PDUs) of the PDCP entity, and enter the RRC inactive state based on the information.

12. The terminal of claim 11, wherein the controller is further configured to:

identify that a resumption of an RRC connection is triggered while the terminal is in the RRC inactive state, and transmit, to the base station, an RRC resume request message.

13. The terminal of claim 12, wherein the resumption of the RRC connection is triggered based on a received paging message.

14. The terminal of claim 11, wherein the state variable includes a first state variable indicating a count value of a next PDCP service data unit (SDU) of the PDCP entity to be transmitted.

15. The terminal of claim 11, wherein the state variable includes a second state variable indicating a count value of a next PDCP service data unit (SDU) of the PDCP entity expected to be received and a third state variable indicating a count value of a first PDCP SDU of the PDCP entity not delivered to an upper layer and waited for.

16. A base station in a wireless communication system, the base station comprising:

a transceiver; and a controller coupled with the transceiver and configured to:

generate a radio resource control (RRC) release message including information configuring an RRC inactive state, wherein the information is to be used by a terminal for:

resetting a medium access control (MAC) entity, suspending all signaling radio bearers (SRBs) and all data radio bearers (DRBs) except for an SRB0, performing, for the all DRBs, operations comprising:

setting a state variable of a packet data convergence protocol (PDCP) entity to an initial value, and discarding all stored PDCP protocol data units (PDUs) of the PDCP entity, and entering the RRC inactive state, and transmit, to the terminal, the RRC release message.

17. The base station of claim 16, wherein the controller is further configured to:

receive, from the terminal, an RRC resume request message based on a resumption of an RRC connection being triggered while the terminal is in the RRC inactive state.

18. The base station of claim 17, wherein the resumption of the RRC connection is triggered based on a paging message transmitted to the terminal.

19. The base station of claim 16, wherein the state variable includes a first state variable indicating a count value of a next PDCP service data unit (SDU) of the PDCP entity to be transmitted.

20. The base station of claim 16, wherein the state variable includes a second state variable indicating a count value of a next PDCP service data unit (SDU) of the PDCP entity expected to be received and a third state variable indicating a count value of a first PDCP SDU of the PDCP entity not delivered to an upper layer and waited for.

* * * * *